US012581459B2

(12) United States Patent
Khoshnevisan et al.

(10) Patent No.: US 12,581,459 B2
(45) Date of Patent: Mar. 17, 2026

(54) PER CORESET POOL INDEX PROCESSING CAPABILITY

(71) Applicant: QUALCOMM Incorporated, San Diego, CA (US)

(72) Inventors: Mostafa Khoshnevisan, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1235 days.

(21) Appl. No.: 17/461,873

(22) Filed: Aug. 30, 2021

(65) Prior Publication Data

US 2023/0065992 A1      Mar. 2, 2023

(51) Int. Cl.
*H04W 72/02* (2009.01)
*H04W 72/0446* (2023.01)
*H04W 72/0453* (2023.01)
*H04W 72/21* (2023.01)
*H04W 72/23* (2023.01)

(52) U.S. Cl.
CPC ....... *H04W 72/02* (2013.01); *H04W 72/0446* (2013.01); *H04W 72/0453* (2013.01); *H04W 72/21* (2023.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2021/0014837 | A1* | 1/2021 | Papasakellariou | H04L 5/0053 |
| 2021/0037484 | A1* | 2/2021 | Zhou | H04W 52/386 |
| 2021/0068099 | A1* | 3/2021 | Khoshnevisan | H04W 72/21 |
| 2021/0226820 | A1* | 7/2021 | Khoshnevisan | H04L 5/0042 |
| 2022/0174717 | A1* | 6/2022 | Hou | H04L 5/0094 |
| 2022/0201727 | A1* | 6/2022 | Gong | H04L 5/0053 |
| 2023/0247616 | A1* | 8/2023 | Liu | H04W 72/51 |
| | | | | 370/329 |
| 2024/0179723 | A1* | 5/2024 | Wang | H04W 72/0446 |

FOREIGN PATENT DOCUMENTS

| | | |
|---|---|---|
| WO | WO-2021021401 A1 | 2/2021 |
| WO | WO-2021040918 A1 | 3/2021 |

OTHER PUBLICATIONS

International Search Report and Written Opinion - PCT/US2022/036717 - ISA/EPO - 2022-11-04 (2106611WO).

* cited by examiner

*Primary Examiner* — Srinivasa R Reddivalam
(74) *Attorney, Agent, or Firm* — Holland & Hart LLP

(57) ABSTRACT

Methods, systems, and devices for wireless communications are described. The method includes transmitting an indication of a capability of a user equipment (UE) to support, for a serving cell, both a first processing capability associated with a first control resource set pool and a second processing capability associated with a second control resource set pool, receiving, from a base station, control signaling identifying a control resource set configuration including the first and second control resource set pool, the first control resource set pool associated with the first processing capability and the second control resource set pool associated with the second processing capability, and communicating one or more messages on a channel according to one of the first or second processing capability that corresponds to the one of the first or second control resource set pool.

24 Claims, 15 Drawing Sheets

610

620

615

605

600

Figure 14:
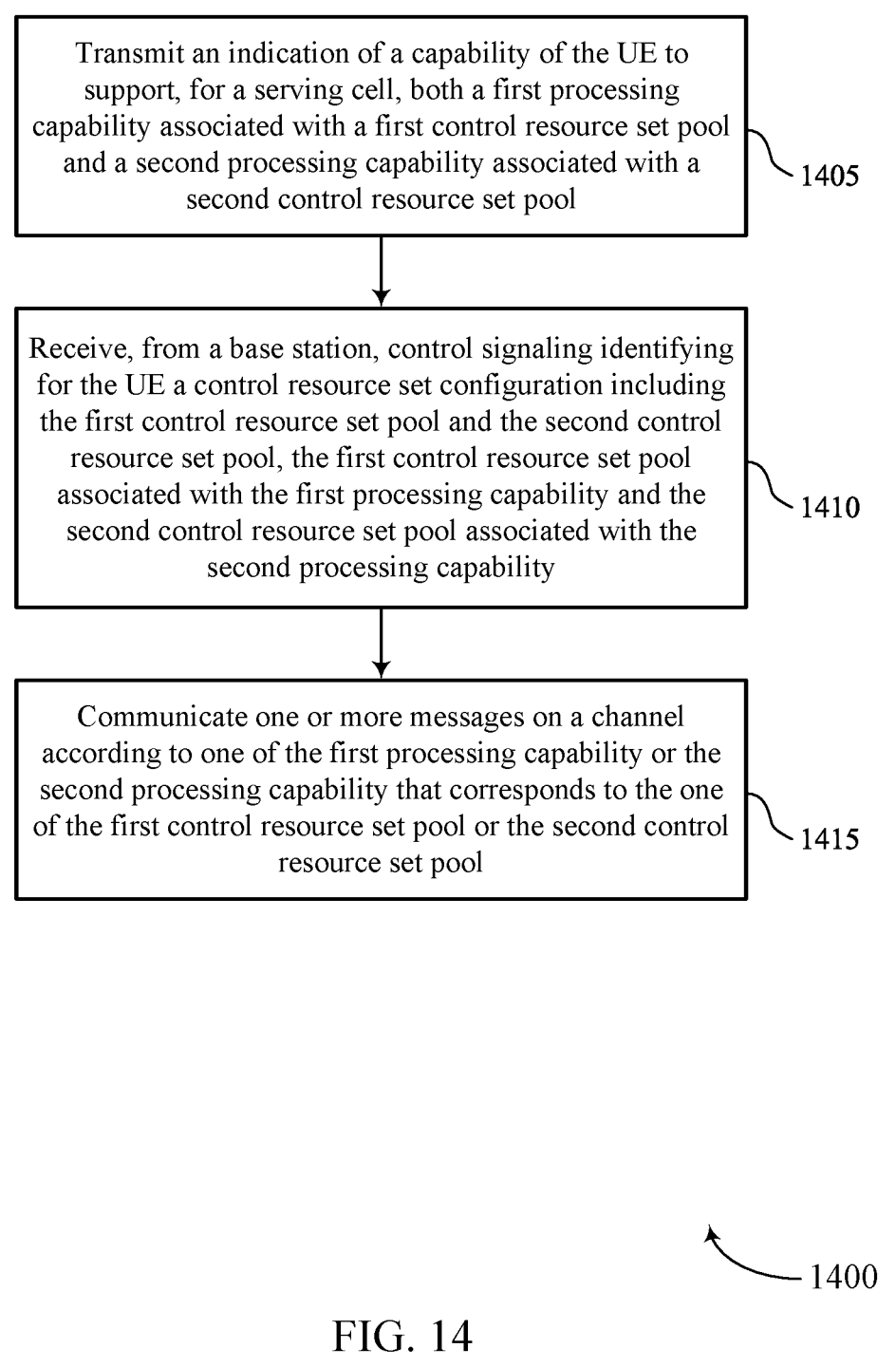

Transmit an indication of a capability of the UE to support, for a serving cell, both a first processing capability associated with a first control resource set pool and a second processing capability associated with a second control resource set pool

1405

Receive, from a base station, control signaling identifying for the UE a control resource set configuration including the first control resource set pool and the second control resource set pool, the first control resource set pool associated with the first processing capability and the second control resource set pool associated with the second processing capability

1410

Communicate one or more messages on a channel according to one of the first processing capability or the second processing capability that corresponds to the one of the first control resource set pool or the second control resource set pool

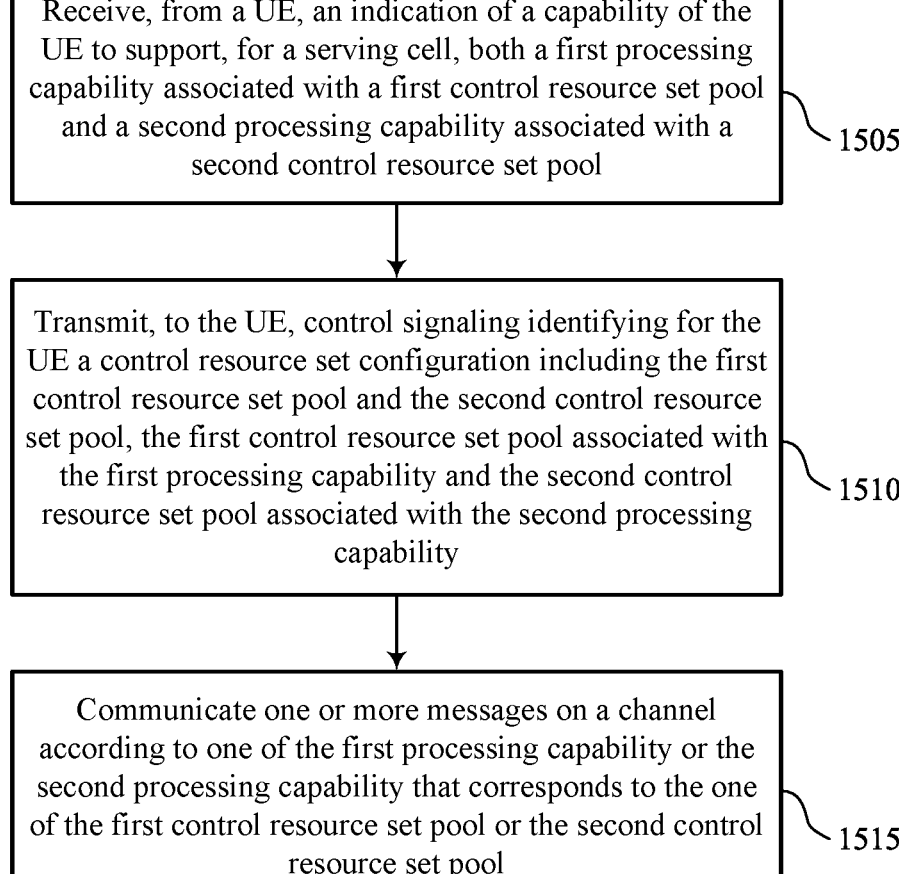

Receive, from a UE, an indication of a capability of the UE to support, for a serving cell, both a first processing capability associated with a first control resource set pool and a second processing capability associated with a second control resource set pool

1505

Transmit, to the UE, control signaling identifying for the UE a control resource set configuration including the first control resource set pool and the second control resource set pool, the first control resource set pool associated with the first processing capability and the second control resource set pool associated with the second processing capability

1510

Communicate one or more messages on a channel according to one of the first processing capability or the second processing capability that corresponds to the one of the first control resource set pool or the second control resource set pool

PER CORESET POOL INDEX PROCESSING CAPABILITY

FIELD OF TECHNOLOGY

The present disclosure relates to wireless communications, including per control resource set (CORESET) pool index processing capability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support a per CORESET pool index processing capability. In some cases, it may be desirable to improve processing capabilities associated with such wireless systems.

SUMMARY

The described techniques relate to improved methods, systems, devices, and apparatuses that support per control resource set (CORESET) pool index processing capability. Generally, the described techniques provide for a user equipment (UE) may transmit an indication of a capability of the UE to support, for a serving cell, both a first processing capability of the UE associated with a first control resource set pool and a second processing capability of the UE associated with a second control resource set pool. In some cases, the UE may receive, from a base station (e.g., of the serving cell), control signaling identifying for the UE a control resource set configuration including the first control resource set pool and the second control resource set pool. In some cases, the first control resource set pool may be associated with the first processing capability and the second control resource set pool may be associated with the second processing capability. In some cases, the UE may communicate (e.g., with the base station) one or more messages on a channel according to one of the first processing capability or the second processing capability that corresponds to the one of the first control resource set pool or the second control resource set pool.

A method for wireless communication at a user equipment (UE) is described. The method may include transmitting an indication of a capability of the UE to support, for a serving cell, both a first processing capability associated with a first control resource set pool and a second processing capability associated with a second control resource set pool, receiving, from a base station, control signaling identifying for the UE a control resource set configuration including the first control resource set pool and the second control resource set pool, the first control resource set pool associated with the first processing capability and the second control resource set pool associated with the second processing capability, and communicating one or more messages on a channel according to one of the first processing capability or the second processing capability that corresponds to the one of the first control resource set pool or the second control resource set pool.

An apparatus for wireless communication at a UE is described. The apparatus may include a processor, memory coupled with the processor, and instructions stored in the memory. The instructions may be executable by the processor to cause the apparatus to transmit an indication of a capability of the UE to support, for a serving cell, both a first processing capability associated with a first control resource set pool and a second processing capability associated with a second control resource set pool, receive, from a base station, control signaling identifying for the UE a control resource set configuration including the first control resource set pool and the second control resource set pool, the first control resource set pool associated with the first processing capability and the second control resource set pool associated with the second processing capability, and communicate one or more messages on a channel according to one of the first processing capability or the second processing capability that corresponds to the one of the first control resource set pool or the second control resource set pool.

Another apparatus for wireless communication at a UE is described. The apparatus may include means for transmitting an indication of a capability of the UE to support, for a serving cell, both a first processing capability associated with a first control resource set pool and a second processing capability associated with a second control resource set pool, means for receiving, from a base station, control signaling identifying for the UE a control resource set configuration including the first control resource set pool and the second control resource set pool, the first control resource set pool associated with the first processing capability and the second control resource set pool associated with the second processing capability, and means for communicating one or more messages on a channel according to one of the first processing capability or the second processing capability that corresponds to the one of the first control resource set pool or the second control resource set pool.

A non-transitory computer-readable medium storing code for wireless communication at a UE is described. The code may include instructions executable by a processor to transmit an indication of a capability of the UE to support, for a serving cell, both a first processing capability associated with a first control resource set pool and a second processing capability associated with a second control resource set pool, receive, from a base station, control signaling identifying for the UE a control resource set configuration including the first control resource set pool and the second control resource set pool, the first control resource set pool associated with the first processing capability and the second control resource set pool associated with the second processing capability, and communicate one or more messages on a channel according to one of the first processing capability or the second processing capability that corresponds to the one of the first control resource set pool or the second control resource set pool.

In some examples of the method, apparatuses, and non-transitory computer-readable medium described herein, communicating on the channel may include operations, features, means, or instructions for receiving downlink control information, transmitting data on a physical uplink shared channel, transmitting uplink control information, receiving data on a physical downlink shared channel, or any combination thereof.

In some examples of the method, apparatuses, and non-transitory computer-readable medium described herein, receiving the control signaling identifying the control resource set configuration for the UE may include operations, features, means, or instructions for receiving the control resource set configuration, where a table at the UE maps between a first index value associated with the first control resource set pool of the control resource set configuration and the first processing capability, and between a second index value associated with the second control resource set pool of the control resource set configuration and the second processing capability.

In some examples of the method, apparatuses, and non-transitory computer-readable medium described herein, receiving the control signaling identifying the control resource set configuration for the UE may include operations, features, means, or instructions for receiving an indication of a mapping between a first index value associated with the first control resource set pool and the first processing capability, and between a second index value associated with the second control resource set pool and the second processing capability.

Some examples of the method, apparatuses, and non-transitory computer-readable medium described herein may further include operations, features, means, or instructions for receiving a downlink control information message in a control resource set, the downlink control information message identifying time and frequency resources for communicating the one or more messages on the channel, where the one or more messages may be communicated on the channel using the first processing capability based on identifying that the control resource set in which the downlink control information message may be received may be of the first control resource set pool.

Some examples of the method, apparatuses, and non-transitory computer-readable medium described herein may further include operations, features, means, or instructions for receiving a control message identifying a configuration of a periodic set of time and frequency resources for communicating on the channel and receiving a downlink control information message in a control resource set, the downlink control information message activating one or more resources of the periodic set of time and frequency resources for communicating the one or more messages on the channel, where the one or more messages may be communicated on the channel using the first processing capability based on identifying that the control resource set in which the downlink control information message may be received may be of the first control resource set pool.

Some examples of the method, apparatuses, and non-transitory computer-readable medium described herein may further include operations, features, means, or instructions for receiving a control message identifying a configuration of a set of multiple periodic sets of time and frequency resources for communicating on the channel, the set of multiple periodic sets of time and frequency resources including at least a first periodic set of time and frequency resources associated with the first control resource set pool and a second periodic set of time and frequency resources associated with the second control resource set pool and receiving a downlink control information message, the downlink control information message activating resources of the first periodic set of time and frequency resources, where the one or more messages may be communicated on the channel using the first processing capability based on the first periodic set of time and frequency resources being associated with the first processing capability.

In some examples of the method, apparatuses, and non-transitory computer-readable medium described herein, the configuration of the first periodic set of time and frequency resources includes a semi-persistent scheduling configuration for downlink communications or a configured grant configuration for uplink communications.

Some examples of the method, apparatuses, and non-transitory computer-readable medium described herein may further include operations, features, means, or instructions for receiving a control message identifying a configuration of a periodic set of time and frequency resources for communicating on the channel, the configuration of the periodic set of time and frequency resources indicating that the periodic set of time and frequency resources may be associated with the first processing capability and receiving a downlink control information message, the downlink control information message activating resources of the periodic set of time and frequency resources, where the one or more messages may be communicated on the channel using the first processing capability based on the configuration indicating that the periodic set of time and frequency resources may be associated with the first processing capability.

In some examples of the method, apparatuses, and non-transitory computer-readable medium described herein, the indication of the capability may be associated with one of downlink or uplink and the method, apparatuses, and non-transitory computer-readable medium may include further operations, features, means, or instructions for transmitting a second indication of a second capability of the UE to support, for a different one of downlink or uplink, or a different one of the first subcarrier spacing or the second subcarrier spacing, or both, at least two different processing capabilities for the first control resource set pool and the second control resource set pool.

In some examples of the method, apparatuses, and non-transitory computer-readable medium described herein, transmitting the indication of the capability may include operations, features, means, or instructions for transmitting an indication of a first quantity of unicast channels per slot associated with the first control resource set pool, and an indication of a second quantity of unicast channels per slot associated with the second control resource set pool, where the first quantity may be different than the second quantity.

Some examples of the method, apparatuses, and non-transitory computer-readable medium described herein may further include operations, features, means, or instructions for transmitting, to the base station, an indication of a number of carriers value and determining that the UE supports the second processing capability in associated cells when the number of carriers value may be greater than or equal to a sum of (a) a number of cells of the associated cells configured independent of the control resource set configuration, (b) a number of cells of the associated cells configured with at least one of different pool index values, and (c) two times a number of the cells of the associated cells configured with a first pool index value and a second pool index value.

Some examples of the method, apparatuses, and non-transitory computer-readable medium described herein may further include operations, features, means, or instructions for transmitting an indication of a capability of the UE to support the second processing capability (a) when a single cell may be configured in a frequency band where the number of carriers value may be reported and the single cell may be not configured with the first pool index value and the second pool index value, or (b) for the first pool index value when a single cell may be configured in a frequency band where the number of carriers value may be reported and the single cell may be configured with the first pool index value and the second pool index value.

In some examples of the method, apparatuses, and non-transitory computer-readable medium described herein, communicating according to the second processing capability may include operations, features, means, or instructions for communicating the one or more messages on the channel according to the second processing capability according to a maximum data rate per cell associated with the second control resource set pool, where the maximum data rate may be based on a maximum quantity of layers, a maximum modulation order, a maximum bandwidth size, or a scaling factor, or any combination thereof, for the cell.

Some examples of the method, apparatuses, and non-transitory computer-readable medium described herein may further include operations, features, means, or instructions for identifying that the channel may be associated with the first control resource set pool and that the channel overlaps with a second channel associated with the second control resource set pool and communicating the one or more messages on the channel based on a sum of a first maximum data rate for the channel and a second maximum data rate for the second channel satisfying a data rate threshold.

A method for wireless communication at a base station is described. The method may include receiving, from a UE, an indication of a capability of the UE to support, for a serving cell, both a first processing capability associated with a first control resource set pool and a second processing capability associated with a second control resource set pool, transmitting, to the UE, control signaling identifying for the UE a control resource set configuration including the first control resource set pool and the second control resource set pool, the first control resource set pool associated with the first processing capability and the second control resource set pool associated with the second processing capability, and communicating one or more messages on a channel according to one of the first processing capability or the second processing capability that corresponds to the one of the first control resource set pool or the second control resource set pool.

An apparatus for wireless communication at a base station is described. The apparatus may include a processor, memory coupled with the processor, and instructions stored in the memory. The instructions may be executable by the processor to cause the apparatus to receive, from a UE, an indication of a capability of the UE to support, for a serving cell, both a first processing capability associated with a first control resource set pool and a second processing capability associated with a second control resource set pool, transmit, to the UE, control signaling identifying for the UE a control resource set configuration including the first control resource set pool and the second control resource set pool, the first control resource set pool associated with the first processing capability and the second control resource set pool associated with the second processing capability, and communicate one or more messages on a channel according to one of the first processing capability or the second processing capability that corresponds to the one of the first control resource set pool or the second control resource set pool.

Another apparatus for wireless communication at a base station is described. The apparatus may include means for receiving, from a UE, an indication of a capability of the UE to support, for a serving cell, both a first processing capability associated with a first control resource set pool and a second processing capability associated with a second control resource set pool, means for transmitting, to the UE, control signaling identifying for the UE a control resource set configuration including the first control resource set pool and the second control resource set pool, the first control resource set pool associated with the first processing capability and the second control resource set pool associated with the second processing capability, and means for communicating one or more messages on a channel according to one of the first processing capability or the second processing capability that corresponds to the one of the first control resource set pool or the second control resource set pool.

A non-transitory computer-readable medium storing code for wireless communication at a base station is described. The code may include instructions executable by a processor to receive, from a UE, an indication of a capability of the UE to support, for a serving cell, both a first processing capability associated with a first control resource set pool and a second processing capability associated with a second control resource set pool, transmit, to the UE, control signaling identifying for the UE a control resource set configuration including the first control resource set pool and the second control resource set pool, the first control resource set pool associated with the first processing capability and the second control resource set pool associated with the second processing capability, and communicate one or more messages on a channel according to one of the first processing capability or the second processing capability that corresponds to the one of the first control resource set pool or the second control resource set pool.

In some examples of the method, apparatuses, and non-transitory computer-readable medium described herein, communicating on the channel may include operations, features, means, or instructions for transmitting downlink control information, receiving data on a physical uplink shared channel, receiving uplink control information, transmitting data on a physical downlink shared channel, or any combination thereof.

In some examples of the method, apparatuses, and non-transitory computer-readable medium described herein, transmitting the control signaling identifying the control resource set configuration for the UE may include operations, features, means, or instructions for transmitting the control resource set configuration, where a table at the UE maps between a first index value associated with the first control resource set pool of the control resource set configuration and the first processing capability, and between a second index value associated with the second control resource set pool of the control resource set configuration and the second processing capability.

In some examples of the method, apparatuses, and non-transitory computer-readable medium described herein, transmitting the control signaling identifying the control resource set configuration for the UE may include operations, features, means, or instructions for transmitting, in the control resource set configuration, an indication of a mapping between a first index value associated with the first control resource set pool and the first processing capability, and between a second index value associated with the second control resource set pool and the second processing capability.

Some examples of the method, apparatuses, and non-transitory computer-readable medium described herein may further include operations, features, means, or instructions for transmitting a downlink control information message in a control resource set, the downlink control information message identifying time and frequency resources for communicating the one or more messages on the channel, where the one or more messages may be communicated on the channel using the first processing capability based on identifying that the control resource set in which the downlink control information message may be received may be of the first control resource set pool.

Some examples of the method, apparatuses, and non-transitory computer-readable medium described herein may further include operations, features, means, or instructions for transmitting a control message identifying a configuration of a periodic set of time and frequency resources for communicating on the channel and transmitting a downlink control information message in a control resource set, the downlink control information message activating one or more resources of the periodic set of time and frequency resources for communicating the one or more messages on the channel, where the one or more messages may be communicated on the channel using the first processing capability based on identifying that the control resource set in which the downlink control information message may be received may be of the first control resource set pool.

Some examples of the method, apparatuses, and non-transitory computer-readable medium described herein may further include operations, features, means, or instructions for transmitting a control message identifying a configuration of a set of multiple periodic sets of time and frequency resources for communicating on the channel, the set of multiple periodic sets of time and frequency resources including at least a first periodic set of time and frequency resources associated with the first control resource set pool and a second periodic set of time and frequency resources associated with the second control resource set pool and transmitting a downlink control information message, the downlink control information message activating resources of the first periodic set of time and frequency resources, where the one or more messages may be communicated on the channel using the first processing capability based on the first periodic set of time and frequency resources being associated with the first processing capability.

Some examples of the method, apparatuses, and non-transitory computer-readable medium described herein may further include operations, features, means, or instructions for transmitting a control message identifying a configuration of a periodic set of time and frequency resources for communicating on the channel, the configuration of the periodic set of time and frequency resources indicating that the periodic set of time and frequency resources may be associated with the first processing capability and transmitting a downlink control information message, the downlink control information message activating resources of the periodic set of time and frequency resources, where the one or more messages may be communicated on the channel using the first processing capability based on the configuration indicating that the periodic set of time and frequency resources may be associated with the first processing capability.

In some examples of the method, apparatuses, and non-transitory computer-readable medium described herein, the indication of the capability may be associated with one of downlink or uplink and the method, apparatuses, and non-transitory computer-readable medium may include further operations, features, means, or instructions for receiving a second indication of a second capability of the UE to support, for a different one of downlink or uplink, or a different one of the first subcarrier spacing or the second subcarrier spacing, or both, at least two different processing capabilities for the first control resource set pool and the second control resource set pool.

In some examples of the method, apparatuses, and non-transitory computer-readable medium described herein, receiving the indication of the capability may include operations, features, means, or instructions for receiving an indication of a first quantity of unicast channels per slot associated with the first control resource set pool, and an indication of a second quantity of unicast channels per slot associated with the second control resource set pool, where the first quantity may be different than the second quantity.

BRIEF DESCRIPTION OF THE DRAWINGS

FIGS. 14 and 15 show flowcharts illustrating methods that support per CORESET pool index processing capability in accordance with aspects of the present disclosure.

DETAILED DESCRIPTION

Figure 1:
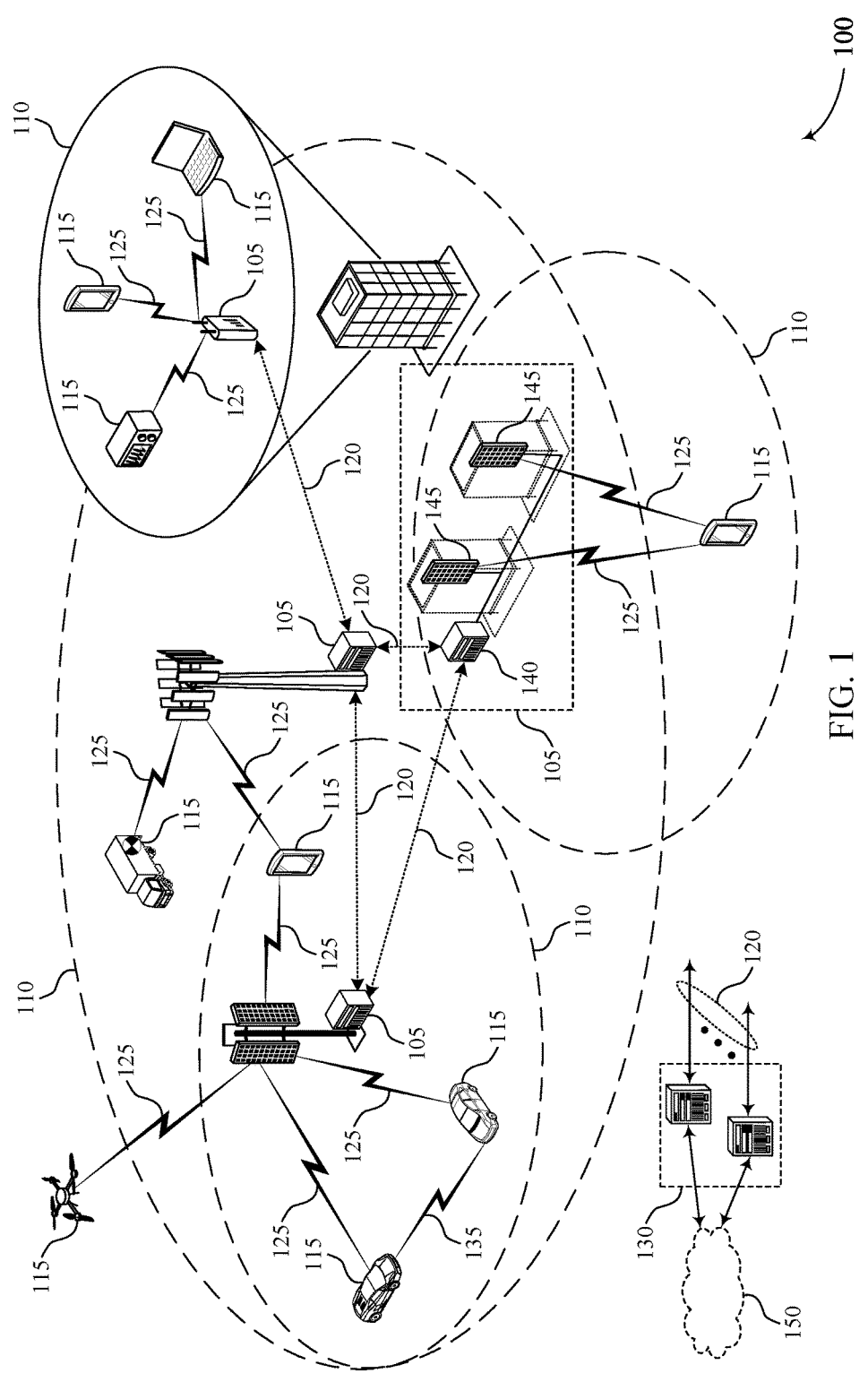
FIG. 1 illustrates an example of a wireless communications system that supports per control resource set (CORESET) pool index processing capability in accordance with aspects of the present disclosure.

A control resource set (CORESET) is a set of physical resources within an area of a downlink resource grid and used to carry physical downlink control channel (PDCCH). One or more CORESETs may be organized into a set or group, which may be referred to as a CORESET pool.

Multiple CORESET pools may be defined or configured, each having one or more CORESETs. The described techniques include per CORESET pool index processing capability. The described techniques associate each CORESET pool (e.g., an index value corresponding to the CORESET pool (which may be referred to as a CORESETPoolIndex or CORESETPoolIndex value)) in a component carrier to a UE processing capability (for example, one of a number of UE processing capabilities).

UE physical downlink shared channel (PDSCH) processing time N1 is the time between the last symbol of PDSCH and the first symbol of physical uplink control channel (PUCCH) that carries hybrid automatic repeat request (HARQ, HARQ acknowledgment (HARQ-ACK)) corresponding to the PDSCH (e.g., N1 indicates the earliest time that HARQ may be scheduled). UE physical uplink shared channel (PUSCH) processing time N2 is the time between the last symbol of PDCCH (e.g., downlink control information (DCI) that schedules a PUSCH) and the first symbol of the scheduled PUSCH corresponding to the PDCCH. In some cases, N1 may depend on a processing capability of a corresponding UE and an associated subcarrier spacing. The UE processing capability may include a relatively slow processing capability (e.g., processing capability 1) and a relatively fast processing capability (e.g., processing capability 2). In some cases, N1 may also depend on whether additional DMRS symbols are configured for UEs of capability 1. In some cases, N2 may depend on the UE processing capability (e.g., whether the UE is of capability 1 or capability 2) and an associated subcarrier spacing.

In other systems, capability 1 and capability 2 processing capabilities (e.g., PDSCH processing and PUSCH processing, respectively) cannot coexist in one component carrier (CC). However, the techniques described herein may include reusing a multi-DCI framework (e.g., two CORE-SETPoolIndex values) to multiplex low priority traffic (e.g., enhanced mobile broadband (eMBB)) and high priority traffic (e.g., ultra-reliable low-latency communication (URLLC)) for the same UE in the same CC. Multiplexing low priority traffic and high priority traffic for the same UE in the same CC enables increased spectral efficient, allowing overlap in the time domain or frequency domain, or both, between a low priority channel (e.g., eMBB PDSCH) and a high priority channel (e.g., URLLC PDSCH). Also, multiplexing low priority traffic and high priority traffic for the same UE in the same CC may enable out-of-order operation between low priority traffic and high priority traffic (e.g., (PDCCH-to-PDSCH, PDCCH-to-PUSCH, PDSCH-to-HARQ-ACK). However, some systems do not support both capability 1 processing and capability 2 processing capability (e.g., for PDSCH processing, PUSCH processing) in one CC. In some cases, high priority traffic may be configured for a relatively fast timeline (e.g., based on capability 2 processing), while for low priority traffic, a regular timeline (e.g., based on capability 1 processing) may be sufficient.

In some examples, a first set of channels (e.g., PDSCH or PUSCH, or both) may be based on capability 1 and a second set of channels (e.g., PDSCH or PUSCH, or both) may be based on capability 2, where the first set of channels and the second set of channels each include one or more channels. However, unless the UE determines which channels are based on which capability, the UE may not be enabled to properly process the channels. In some cases, the UE may first identify which channels are based on capability 1 and identify which channels are based on capability 2. Based on these identifications, the UE may determine that one or more channels (e.g., the first set of channels) are based on capability 1, and thus, are to be processed according to capability 1. Similarly, the UE may determine that another one or more channels (e.g., the second set of channels) are based on capability 2, and thus, are to be processed according to capability 2.

The described techniques reuse a multi-DCI framework (e.g., two CORESETPoolIndex values) to enable multiplexing of low priority traffic (e.g., eMBB) and high priority traffic (e.g., URLLC) for the same UE in the same CC, allowing a low-priority PDSCH and high-priority PDSCH to overlap in time and/or frequency. Accordingly, the described techniques propose to associate each CORESETPoolIndex value in a given CC to a UE processing capability (capability 1 or capability 2). The described techniques enable a UE to determine which channels are based on capability 1 and which channels are based on capability 2 so that the UE may determine how to process a first set of channels according to capability 1 processing and how to process a second set of channels according to capability 2 processing. Based on the described techniques, the UE, in a given CC, processes channels associated with a first CORESETPoolIndex value based on capability 1 and processes channels associated with a second CORESETPoolIndex value based on capability 2.

Aspects of the subject matter described herein may be implemented to realize one or more advantages. The described techniques may support improvements in system efficiency, providing multiplexing of low priority traffic (e.g., eMBB) and high priority traffic (e.g., URLLC) for the same UE in the same CC, allowing a low-priority PDSCH and high-priority PDSCH to overlap in time and/or frequency. The described techniques avoid multiple retransmissions and failed transmissions, decreasing system latency, increasing the reliability of uplink and downlink transmissions, and improving user experience.

Aspects of the disclosure are initially described in the context of wireless communications systems. Aspects of the disclosure are further illustrated by and described with reference to additional wireless communications systems and time frequency diagrams that relate to per CORESET pool index processing capability. Aspects of the disclosure are further illustrated by and described with reference to apparatus diagrams, system diagrams, and flowcharts that relate to per CORESET pool index processing capability.

FIG. 1 illustrates an example of a wireless communications system 100 that supports per CORESET pool index processing capability in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may transmit an indication of a capability of the UE 115 to support, for a serving cell, both a first processing capability of UE 115 associated with a first control resource set pool and a second processing capability of UE 115 associated with a second control resource set pool. In some cases, UE 115 may receive, from a base station 105, control signaling identifying for UE 115 a control resource set configuration including the first control resource set pool and the second control resource set pool. In some cases, the first control resource set pool may be associated with the first processing capability and the second control resource set pool may be associated with the second processing capability. In some cases, UE 115 may communicate (e.g., with base station 105) one or more messages on a channel according to one of the first processing capability or the second processing capability that corresponds to the one of the first control resource set pool or the second control resource set pool.

Figure 2:
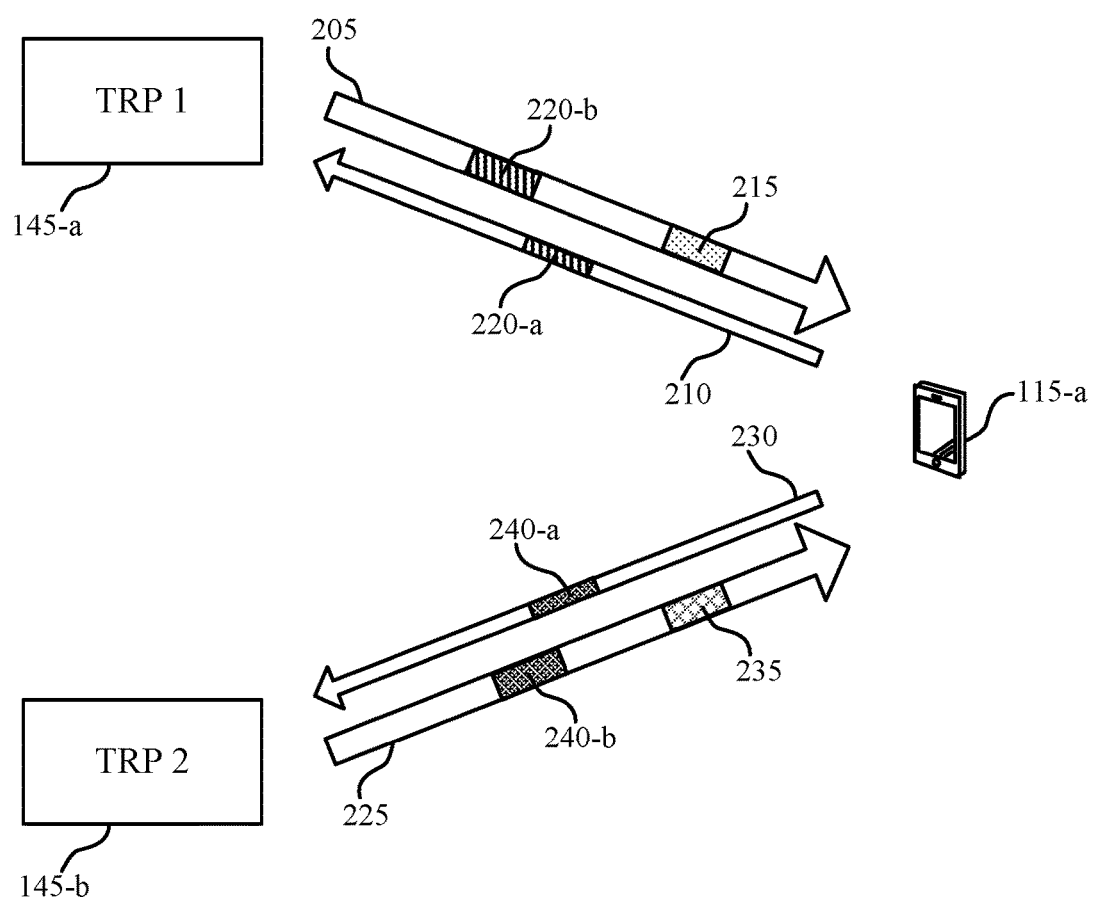
FIG. 2 illustrates an example of a wireless communications system that supports per CORESET pool index processing capability in accordance with aspects of the present disclosure.
Figure 2:
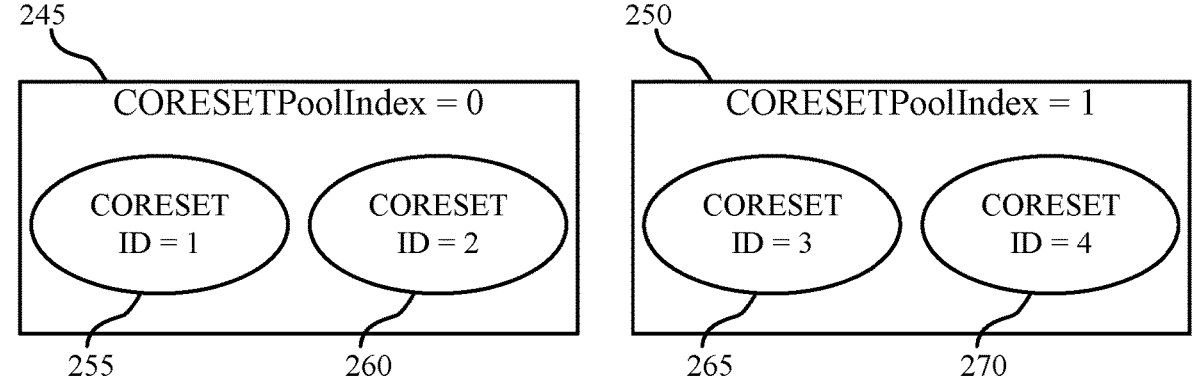

FIG. 2 illustrates an example of a wireless communications system 200 that supports per CORESET pool index processing capability in accordance with aspects of the present disclosure. In some examples, some aspects of wireless communications system 200 may implement or be implemented by aspects of wireless communications system 100. For example, wireless communications system 200 may include transmission/reception point (TRP) 145-a and TRP 145-b (e.g., a first TRP and a second TRP), which may be examples of a base station 105 described with reference to FIG. 1. In some examples, each of TRPs 145-a and TRP 145-b may be base stations 105. Wireless communications system 200 may also include UE 115-a, which may be an example a UE 115 described with reference to FIG. 1.

As illustrated, wireless communications system 200 may also include downlink 205 and uplink 210. TRP 145-a may use downlink 205 to convey control and/or data information to UE 115-a. And UE 115-a may use uplink 210 to convey control and/or data information to TRP 145-a. In some cases, downlink 205 may use different time and/or frequency resources than uplink 210. As illustrated, wireless communications system 200 may also include downlink 225 and uplink 230. TRP 145-b may use downlink 225 to convey control and/or data information to UE 115-a. And UE 115-a may use uplink 230 to convey control and/or data information to TRP 145-b. In some cases, downlink 225 may use different time and/or frequency resources than uplink 230.

In the illustrated example, wireless communications system 200 may be based on a multi-DCI based design with multi-TRP transmissions. In some cases, first physical downlink control channel 215 (e.g., a first DCI) may be transmitted from TRP 145-a to UE 115-a. In some cases, first scheduled channel 220 may be scheduled based on first physical downlink control channel 215. In some cases, first scheduled channel 220 may include first physical uplink shared channel 220-a or first physical uplink control channel 220-a, or both, transmitted to TRP 145-a. In some cases, first scheduled channel 220 may include first physical downlink shared channel 220-b transmitted from TRP 145-a.

In some examples, second physical downlink control channel 235 (e.g., a second DCI) may be transmitted from TRP 145-b to UE 115-a. In some cases, second scheduled channel 240 may be scheduled based on second physical downlink control channel 235. In some cases, second scheduled channel 240 may include second physical uplink shared channel 240-a or second physical uplink control channel 240-a, or both, transmitted to TRP 145-b. In some cases, second scheduled channel 240 may include second physical downlink shared channel 240-b transmitted from TRP 145-b.

In some examples, UE 115-a may differentiate transmissions received from TRP 145-a and TRP 145-b based on respective corresponding CORESETPoolIndex values. Each CORESET (e.g., up to five CORESETs) may be configured with a CORESETPoolIndex value. The CORESETPoolIndex value may be 0 or 1, which groups each CORESET into one of two groups (e.g., a first group of value 0, and a second group of value 1). In the illustrated example, UE 115-a may be configured with a first CORESETPoolIndex value 245 (e.g., value=0) and a second CORESETPoolIndex value 250 (e.g., value=1). As shown, first CORESETPoolIndex value 245 may be associated with a first CORESET identifier 255 and a second CORESET identifier 260, while second CORESETPoolIndex value 250 may be associated with a third CORESET identifier 265 and a fourth CORESET identifier 270.

In some cases, the transmissions from TRP 145-a and TRP 145-b may be transparent to UE 115-a other than CORESETPoolIndex values corresponding with respective transmissions. UE 115-a may be configured with multi-DCI based multi-TRP (e.g., determine it is configured with multi-DCI based multi-TRP) when UE 115-a is configured by higher layer parameter PDCCH-Config that contains two different values of CORESETPoolIndex in CORESETs for the active bandwidth part of a serving cell (e.g., TRP 145-a or TRP 145-b, or both). In some cases, the two different values of CORESETPoolIndex contained in the higher layer parameter PDCCH-Config may include first CORESET-PoolIndex value 245 and second CORESETPoolIndex value 250. In some cases, multi-TRP operation may be defined in a given CC (e.g., serving cell) by configuring two CORE-SETPoolIndex values (e.g., first CORESETPoolIndex value 245 and second CORESETPoolIndex value 250) in different CORESETs in the active bandwidth part of that CC. When a CORESET is not configured with a CORESETPoolIndex value, the UE 1150-a may assume the value (e.g., assume value=0) for that CORESET.

In some examples, channels or signals that are dynamically scheduled by a DCI may be associated with a CORE-SETPoolIndex value (e.g., first CORESETPoolIndex value 245 or second CORESETPoolIndex value 250). In some cases, the channels or signals dynamically scheduled by a DCI may be associated with a CORESETPoolIndex value based on a CORESET configuration of the scheduling DCI. In some cases, the channels or signals dynamically scheduled by a DCI may include a PDSCH scheduled by a DCI (e.g., for DCI format 1_0, 1_1, 1_2), a HARQ-ACK (e.g., transmitted on PUCCH) for a PDSCH that is scheduled by a DCI (for DCI formats 1_0, 1_1, 1_2), or a PUSCH scheduled by a DCI (e.g., for DCI formats 0_0, 0_1, 0_2). In some cases, the channels or signals dynamically sched-uled by a DCI may include a semi-persistent scheduling (SPS) PDSCH, a HARQ-ACK (e.g., transmitted on PUCCH) for semi-SPS PDSCH, or a channel state informa-tion (CSI) report (e.g., transmitted on PUCCH) for persistent or semi-persistent CSI. In some cases, the channels or signals dynamically scheduled by a DCI may include sched-uling request (SR) transmissions (e.g., on PUCCH) or a configured grant (CG) PUSCH (CG-PUSCH) for type 1 or type 2 CG.

In some examples, the described techniques may enable UE 115-a with simultaneous PDSCH reception in one CC. In some systems, two PDSCH's in one CC may not be overlapping in time even partially, even if they are com-pletely non-overlapping in frequency. Also, in some sys-tems, out-of-order operation is not allowed (e.g., PDCCH-to-PDSCH, PDSCH-to-HARQ-ACK, PDCCH-to-PUSCH are in-order). Based on the described multi-DCI techniques, two PDSCHs associated with different CORESETPoolIndex values may be fully or partially overlapping in time domain or frequency domain, or both. Also, out-of-order operation is allowed across different CORESETPoolIndex values, or across different TRPs (e.g., across TRP 145-a and TRP 145-b). Within a given CORESETPoolIndex value (e.g., within first CORESETPoolIndex value 245 or within second CORESETPoolIndex value 250), operations remain in order.

In some examples, UE 115-a may transmit an indication of a capability of UE 115-a to support, for a serving cell (e.g., first TRP 145-a or second TRP 145-b, or both), both a first processing capability (e.g., capability 1) associated with a first control resource set pool and a second processing capability (e.g., capability 2) associated with a second control resource set pool. In some cases, the first control resource set pool is associated with first CORESETPoolIn-dex value 245 and the second control resource set pool is associated with second CORESETPoolIndex value 250. In some cases, UE 115-a may receive, from a base station (e.g., first TRP 145-a or second TRP 145-b), control signaling identifying for UE 115-a a control resource set configuration including the first control resource set pool and the second control resource set pool, the first control resource set pool associated with the first processing capability and the second control resource set pool associated with the second pro-cessing capability.

In some examples, the indication of the capability may be associated with one of downlink or uplink, or one of a first subcarrier spacing or a second subcarrier spacing, or both. In some examples, UE 115-a may transmit a second indication of a second capability of UE 115-a to support, for a different one of downlink or uplink, or a different one of the first subcarrier spacing or the second subcarrier spacing, or both, at least two different processing capabilities for the first control resource set pool and the second control resource set pool. In some cases, UE 115-a transmitting the indication of the capability may include UE 115-a transmitting an indi-cation of a first quantity of unicast channels per slot asso-ciated with the first control resource set pool, and an indication of a second quantity of unicast channels per slot associated with the second control resource set pool. In some cases, the first quantity is different than the second quantity.

In some examples, UE 115-a may communicate one or more messages on a channel according to one of the first processing capability or the second processing capability that corresponds to the one of the first control resource set pool or the second control resource set pool. In some cases, UE 115-a communicating on the channel may include UE 115-a receiving downlink control information (e.g., via PDCCH), transmitting data on a physical uplink shared channel (e.g., PUSCH), transmitting uplink control infor-mation (e.g., PUCCH), receiving data on a physical down-link shared channel (e.g., PDSCH), or any combination thereof.

In some examples, UE 115-a receiving the control sig-naling identifying the control resource set configuration for UE 115-a may include UE 115-a receiving the control resource set configuration. In some cases, a table at UE 115-a maps between a first index value (e.g., first CORE-SETPoolIndex value 245) associated with the first control resource set pool of the control resource set configuration and the first processing capability, and between a second index value (e.g., second CORESETPoolIndex value 250) associated with the second control resource set pool of the control resource set configuration and the second processing capability.

In some examples, UE 115-a receiving the control sig-naling identifying the control resource set configuration for UE 115-a may include UE 115-a receiving an indication of a mapping between a first index value (e.g., first CORE-SETPoolIndex value 245) associated with the first control resource set pool and the first processing capability, and between a second index value (e.g., second CORESET-PoolIndex value 250) associated with the second control resource set pool and the second processing capability. In some cases, the indication may be transmitted and received in the control resource set configuration or a resource radio control configuration.

In some examples, UE 115-a may receive a downlink control information message in a control resource set. In some cases, the downlink control information message may identify time and frequency resources for communicating the one or more messages on the channel. In some cases, the one or more messages may be communicated on the channel using the first processing capability based on identifying that the control resource set in which the downlink control information message is received is of the first control resource set pool.

In some examples, UE 115-*a* may receive a control message identifying a configuration of a periodic set of time and frequency resources for communicating on the channel. In some cases, UE 115-*a* may receive a downlink control information message in a control resource set, where the downlink control information message activates one or more resources of the periodic set of time and frequency resources for communicating the one or more messages on the channel. In some cases, the one or more messages may be communicated on the channel using the first processing capability based on identifying that the control resource set in which the downlink control information message is received is of the first control resource set pool.

In some examples, UE 115-*a* may receive a control message identifying a configuration of periodic sets of time and frequency resources for communicating on the channel, the periodic sets of time and frequency resources including at least a first periodic set of time and frequency resources associated with the first control resource set pool and a second periodic set of time and frequency resources associated with the second control resource set pool. In some cases, UE 115-*a* may receive a downlink control information message, the downlink control information message activating resources of the first periodic set of time and frequency resources. In some cases, the one or more messages may be communicated on the channel using the first processing capability based on the first periodic set of time and frequency resources being associated with the first processing capability.

In some examples, UE 115-*a* may receive a control message identifying a configuration of a periodic set of time and frequency resources for communicating on the channel, the configuration of the periodic set of time and frequency resources indicating that the periodic set of time and frequency resources are associated with the first processing capability. In some cases, UE 115-*a* may receive a downlink control information message, the downlink control information message activating resources of the periodic set of time and frequency resources. In some cases, the one or more messages may be communicated on the channel using the first processing capability based on the configuration indicating that the periodic set of time and frequency resources is associated with the first processing capability. In some cases, the configuration of the first periodic set of time and frequency resources may include a semi-persistent scheduling configuration for downlink communications or a configured grant configuration for uplink communications.

In some examples, UE 115-*a* may transmit, to a base station (e.g., TRP 145-*a* or TRP 145-*b*), an indication of a number of carriers value (e.g., a value indicating a number of carriers). In some cases, UE 115-*a* may support the second processing capability in associated cells when the number of carriers value is greater than or equal to a sum of (a) a number of cells of the associated cells configured independent of the control resource set configuration, (b) a number of cells of the associated cells configured with at least one of the different pool index values, and (c) two times a number of the cells of the associated cells configured with the first pool index value and the second pool index value. In some cases, UE 115-*a* may transmit an indication of a capability of UE 115-*a* to support the second processing capability (a) when a single cell is configured in a frequency band where the number of carriers value is reported and the single cell is not configured with the first pool index value and the second pool index value, or (b) for the first pool index value when a single cell is configured in a frequency band where the number of carriers value is reported and the single cell is configured with the first pool index value and the second pool index value.

In some examples, UE 115-*a* communicating according to the second processing capability may include UE 115-*a* communicating the one or more messages on the channel according to the second processing capability according to a maximum data rate per cell associated with the second control resource set pool. In some cases, the maximum data rate is based on a maximum quantity of layers, a maximum modulation order, a maximum bandwidth size, or a scaling factor, or any combination thereof, for the cell.

In some examples, UE 115-*a* may identify that the channel is associated with the first control resource set pool and that the channel overlaps with a second channel associated with the second control resource set pool. In some cases, UE 115-*a* may communicate the one or more messages on the channel based on a sum of a first maximum data rate for the channel and a second maximum data rate for the second channel satisfying a data rate threshold.

The described techniques may increase spectral efficiency in relation to the communications between UE 115-*a* and TRP 145-*a*, or between UE 115-*a* and TRP 145-*b*, or both. The described techniques reuse a multi-DCI framework (e.g., first CORESETPoolIndex value 245 and second CORESETPoolIndex value 250) to enable multiplexing, for the same UE (e.g., UE 115-*a*) in the same CC, traffic of a low priority channel (e.g., eMBB PDSCH) with traffic of a high priority channel (e.g., URLLC PDSCH), thus increasing spectral efficiency, and thus improving user experience.

In some examples, in a given CC, UE 115-*a* may process channels associated with first CORESETPoolIndex value 245 based on the first processing capability (e.g., capability 1) and channels associated with second CORESETPoolIndex value 250 based on the second processing capability (e.g., capability 2). In some cases, capability 2 indicates a faster capability than capability 1. In some cases, channels may be mapped to capability 1 or capability 2 based on a fixed mapping. In some cases, first CORESETPoolIndex value 245 may be associated with capability 1 and second CORESETPoolIndex value 250 may be associated with capability 2 based on a fixed mapping. In some cases, channels may be mapped to capability 1 or capability 2 based on a radio resource control (RRC) configuration. In some examples, the RRC configuration may indicate that first CORESETPoolIndex value 245 is associated with capability 2. In some cases, capability 2 processing timing may be enabled for first CORESETPoolIndex value 245 or second CORESETPoolIndex value 250, or for both.

In some examples, UE 115-*a* may indicate through UE capability signaling whether it supports two different processing time (capability 1, capability 2) associated with different CORESETPoolIndex values (e.g., first CORESETPoolIndex value 245 and second CORESETPoolIndex value 250) in a given CC. In some cases, the capability signaling is indicated separately for downlink (e.g., PDSCH processing) and uplink (e.g., PUSCH processing). In some cases, the capability signaling is indicated separately for each subcarrier spacing. In some cases, UE 115-*a* may indicate a first maximum number of unicast PDSCHs per slot or PUSCHs per slot, or both, associated with first CORESET- PoolIndex value 245, and a second maximum number of unicast PDSCHs per slot or PUSCHs per slot, or both, associated with second CORESETPoolIndex value 250, where the first maximum number is the same as or different than the second maximum number.

In some examples, UE 115-*a* may indicate a number of carriers (e.g., numberOfCarriers). When (a) the number of configured CC's without CORESETPoolIndex configurations or with one CORESETPoolIndex value, and (b) two times the number of configured CC's with two CORESETPoolIndex values is smaller or equal to reported numberOfCarriers (e.g., when (a)+(b) is smaller or equal to reported numberOfCarriers), then UE 115-*a* supports capability 2 in all CCs and for both CORESETPoolIndex values (e.g., first CORESETPoolIndex value 245 and second CORESETPoolIndex value 250) in the CCs that are configured with two values of CORESETPoolIndex values. Based on this, in some cases, each CC with two CORESETPoolIndex values is counted two times. For the CC operating based on (b), each CC is counted twice because each of these CCs have two processing capabilities (e.g., capability 1 and capability 2).

Otherwise (e.g., when (a)+(b) is greater than the reported numberOfCarriers), then when fallback=single carrier ("sc"), UE 115-*a* supports capability 2 processing time on the lowest cell index among the configured CCs in the band where the value is reported, and when that CC is configured with two CORESETPoolIndex values (e.g., first CORESETPoolIndex value 245 and second CORESETPoolIndex value 250), UE 115-*a* supports capability 2 for the first CORESETPoolIndex value 245 (e.g., UE 115-*a* supports only capability 2 for the first CORESETPoolIndex value 245). When fallback="cap1-only," then UE 115-*a* supports capability 1 processing time (e.g., only capability 1 processing time) in the band where the value is reported (e.g., for all CCs and both CORESETPoolIndex values when configured). When UE 115-*a* indicates support of capability 2 with scheduling limitation, UE 115-*a* supports this limited processing capability 2 when (e.g., only when) one CC is configured in the band and when (e.g., only when) the CC is not configured with two CORESETPoolIndex values. When UE 115-*a* indicates support of capability 2 with scheduling limitation, UE 115-*a* supports this limited processing capability 2 when (e.g., only when) one CC is configured in the band and when capability 2 is supported for (e.g., only for) the first CORESETPoolIndex value 245 when the CC is configured with two CORESETPoolIndex values.

In some examples, there is a per-PDSCH maximum data rate when the CC is configured with capability 2 processing time, where the DataRateCC is determined based on UE capabilities indicated by UE 115-*a* such as max number of layers, max modulation order, max bandwidth, and a scaling factor (e.g., 0.4, 0.75, 0.8, 1.0). When one or both CORESETPoolIndex values (e.g., first CORESETPoolIndex value 245 and second CORESETPoolIndex value 250) are enabled with capability 2 processing time, a maximum data rate per CC per CORESETPoolIndex should be satisfied for a channel (e.g., PDSCH or PUSCH) associated with that CORESETPoolIndex value, where the maximum data rate is calculated based on the max number of layers, maximum modulation order, maximum bandwidth size, and a scaling factor (e.g., 0.4, 0.75, 0.8, 1.0). In some cases, the maximum number of layers per CORESETPoolIndex value may be used as indicated by UE 115-*a*. In some cases, UE 115-*a* may indicate different scaling factors for different CORESETPoolIndex values. In some cases, when two channels (e.g., PDSCHs, PUSCHs) in the CC associated with different CORESETPoolIndex values are overlapping, a sum data rate across the channels (e.g., PDSCHs, PUSCHs) in the CC should be satisfied. In some cases, satisfying the sum data rate across the channels in the CC may be applicable when both CORESETPoolIndex values are associated with capability 2 processing time.

Figure 3:
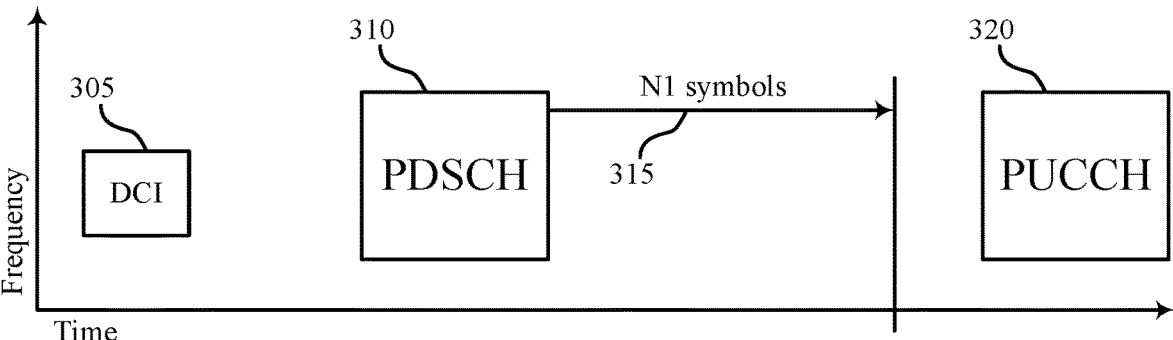
FIG. 3 illustrates an example of a time frequency diagram that supports per CORESET pool index processing capability in accordance with aspects of the present disclosure.

FIG. 3 illustrates an example of a time frequency diagram 300 that supports per CORESET pool index processing capability in accordance with aspects of the present disclosure. In some examples, some aspects of time frequency diagram 300 may implement or be implemented by aspects of wireless communications system 100. For example, some aspects of time frequency diagram 300 may be implemented by UE 115-*a*, TRP 145-*a*, or TRP 145-*b*, or any combination thereof, which may be respective examples of a UE 115 and base station 105 described with reference to FIG. 1.

In the illustrated example, time frequency diagram 300 depicts a downlink control information (DCI) 305 (e.g., received by a UE 115, transmitted by a TRP 145), a physical downlink shared channel (PDSCH) 310 (e.g., received by a UE 115, transmitted by a TRP 145), processing time N1 315 (e.g., PDSCH processing time), and a physical uplink control channel (PUCCH) 320 (e.g., transmitted by a UE 115, received by a TRP 145). In some cases, DCI 305 schedules PDSCH 310 and corresponding PUCCH 320 (e.g., HARQ-ACK).

In some examples, processing time N1 315 may indicate the time (e.g., minimum processing time) between PDSCH 310 (e.g., the last symbol of PDSCH) and PUCCH 320 (e.g., the first symbol of PUCCH). In some cases, processing time N1 315 indicates the earliest time that HARQ-ACK may be scheduled (e.g., not the actual time when HARQ-ACK is transmitted). In some cases, the actual transmission time of HARQ-ACK may depend on scheduling information in DCI 305 (e.g., K1, PUCCH resource indicator (PRI), etc.). In some cases, PUCCH 320 carries HARQ-ACK corresponding to PDSCH 310. In some cases, processing time N1 315 is measured in number of symbols. In some cases, processing time N1 315 may depend on a UE capability (e.g., whether a UE is of processing capability 1, or processing capability 2) and a subcarrier spacing (e.g., associated with DCI 305, PDSCH 310, PUCCH 320). In some cases, processing time N1 315 may depend on whether additional demodulation reference signal (DMRS) symbols are configured when the UE is of processing capability 1. For a UE (e.g., UE 115) that supports capability 2 on a given cell, the processing time N1 315 according to UE processing capability 2 is applied when the high layer parameter processingType2Enabled in PDSCH-ServingCellConfig is configured for the cell and set to "enable." In some cases, processing capability 2 may be defined for frequency range 1 (e.g., only for frequency range 1).

In some examples, for processing time N1 315 (e.g., PDSCH decoding, HARQ-ACK transmission for PDSCH 310), when PDSCH 310 is scheduled by DCI 305, a corresponding CORESETPoolIndex value (e.g., corresponds to CORESETPoolIndex value 0 or CORESETPoolIndex value 1) may be determined from the CORESET in which the scheduling DCI (e.g., DCI 305) is detected. For a semi-persistent scheduling (SPS) channel (e.g., PDSCH 310) the CORESETPoolIndex value may be determined from the CORESET in which the activating DCI (e.g., DCI 305) is detected. In some cases, the corresponding CORESETPoolIndex value may be RRC configured per SPS configuration. In some cases, there may be multiple SPS configurations where some of the SPS configured channels are associated with CORESETPoolIndex value 0, and others of the SPS configured channels are associated with CORESET-PoolIndex value 1, where the SPS configured channels include PUCCH 320. In some cases, the corresponding CORESETPoolIndex value may be associated with a fixed processing capability (fixed to capability 1 or fixed to capability 2).

Figure 4:
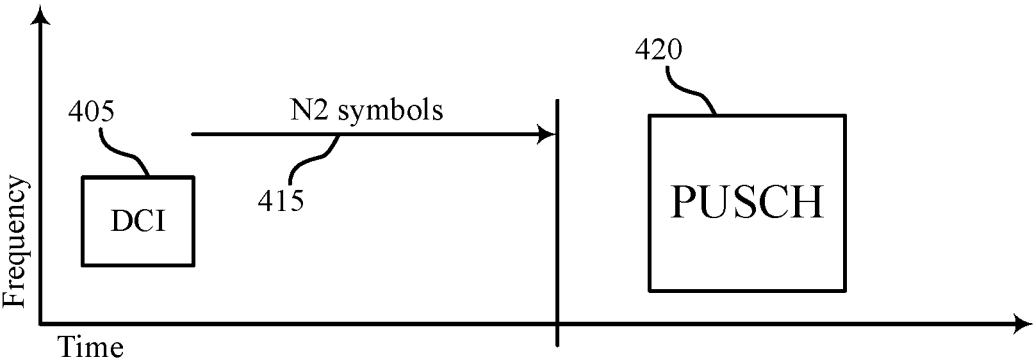
FIG. 4 illustrates an example of a time frequency diagram that supports per CORESET pool index processing capability in accordance with aspects of the present disclosure.

FIG. 4 illustrates an example of a time frequency diagram 400 that supports per CORESET pool index processing capability in accordance with aspects of the present disclosure. In some examples, some aspects of time frequency diagram 400 may implement or be implemented by aspects of wireless communications system 100. For example, some aspects of time frequency diagram 400 may be implemented by UE 115-*a*, TRP 145-*a*, or TRP 145-*b*, or any combination thereof, which may be respective examples of a UE 115 and base station 105 described with reference to FIG. 1.

In the illustrated example, time frequency diagram 400 depicts a downlink control information (DCI) 405 (e.g., received by a UE 115, transmitted by a TRP 145), processing time N2 415 (e.g., PUSCH processing time), and a physical uplink shared channel (PUSCH) 420 (e.g., transmitted by a UE 115, received by a TRP 145). In some cases, DCI 405 schedules PUSCH 420 (e.g., uplink data).

In some examples, processing time N2 415 indicates a time (e.g., minimum processing time) between DCI 405 (e.g., a last symbol of PDCCH that schedules PUSCH 420) and PUSCH 420 (e.g., the first symbol of scheduled PUSCH). In some cases, processing time N2 415 is measured in number of symbols. In some cases, processing time N2 415 may depend on a UE capability (e.g., whether a UE is of processing capability 1, or processing capability 2) and a subcarrier spacing (e.g., associated with DCI 405 and PUSCH 420). For a UE (e.g., UE 115) that supports capability 2 on a given cell, the processing time N2 415 according to UE processing capability 2 is applied when the high layer parameter processingType2Enabled in PUSCH-ServingCellConfig is configured for the cell and set to "enable." In some cases, processing capability 2 may be defined for frequency range 1 (e.g., only for frequency range 1). In some cases, processing time N2 415 indicates the earliest time PUSCH 420 may be scheduled (e.g., not the actual time when PUSCH 420 is transmitted). In some cases, the actual transmission time of PUSCH 420 may depend on scheduling information in DCI 405 (e.g., time domain resource assignment (TDRA) in DCI 405, including K2, start and length indicator value (SLIV), etc.).

In some examples, pdsch-ProcessingType2 indicates whether a UE (e.g., UE 115) supports PDSCH processing capability 2. The UE supports processing capability 2 if all serving cells are self-scheduled and if all serving cells in one band on which the network configured processing type 2 use the same subcarrier spacing. This capability signaling comprises multiple parameters for each sub-carrier spacing supported by the UE. The parameters include fallback, which indicates whether the UE supports PDSCH processing capability 2 when the number of configured carriers is larger than numberOfCarriers for a reported value of differentTB-PerSlot. When fallback="sc" (e.g., single carrier), then the UE supports capability 2 processing time on a lowest cell index among the configured carriers in the band where the value is reported. When fallback="cap1-only," then the UE supports only capability 1 in the band where the value is reported. The parameters include differentTB-PerSlot, which indicates whether the UE supports processing type 2 for 1, 2, 4 and/or 7 unicast PDSCHs for different transport blocks per slot per CC; and if so, differentTB- PerSlot indicates up to which number of carrier aggregation (CA) serving cells that the UE supports in relation to unicast PDSCHs for different transport blocks (TBs). In some cases, the UE may include at least one of numberOfCarriers for 1, 2, 4 or 7 transport blocks per slot in this field if pdsch-ProcessingType2 is indicated.

In some examples, pdsch-ProcessingType2-Limited indicates whether the UE supports PDSCH processing capability 2 with scheduling limitation for subcarrier spacing (SCS) 30 kHz. The capability signaling pdsch-ProcessingType2-Limited includes a number of parameters. The parameters include differentTB-PerSlot-SCS-30 kHz, which indicates the number of different TBs per slot. The UE supports this limited processing capability 2 if (a) one carrier is configured in the band, independent of the number of carriers configured in the other bands; (b) the maximum bandwidth of PDSCH is 136 physical resource blocks (PRBs); and (c) PDSCH decoding time N1 for SCS 30 kHz.

In some examples, for processing time N2 415 when PUSCH 420 is scheduled by DCI 405, a corresponding CORESETPoolIndex value (e.g., corresponds to CORESETPoolIndex value 0 or CORESETPoolIndex value 1) may be determined from the CORESET in which the scheduling DCI (e.g., DCI 405) is detected. As shown, processing time N2 415 ends before PUSCH 420 occurs in the illustrated example. In some cases, for configured grant channels (e.g., PUSCH 420), there may be no N2 timeline for PUSCH 420 itself, as PUSCH 420 has no corresponding DCI. Nonetheless, processing time N2 415 may be satisfied in the presence of uplink control information (UCI) multiplexing on PUSCH 420 with regards to other DCIs that result in UCI multiplexing.

In some examples, for a configured grant (CG) channel (e.g., PUSCH 420) the CORESETPoolIndex value may be determined from the CORESET in which the activating DCI (e.g., DCI 405) is detected. In some cases, the corresponding CORESETPoolIndex value may be RRC configured per CG configuration. In some cases, there may be multiple CG configured channels where some of the CG configured channels are associated with CORESETPoolIndex value 0, and others of the CG configured channels are associated with CORESETPoolIndex value 1, where the CG configured channels include PUSCH 420. In some cases, the corresponding CORESETPoolIndex value may be associated with a fixed processing capability (e.g., fixed to capability 1 or fixed to capability 2).

Figure 5:
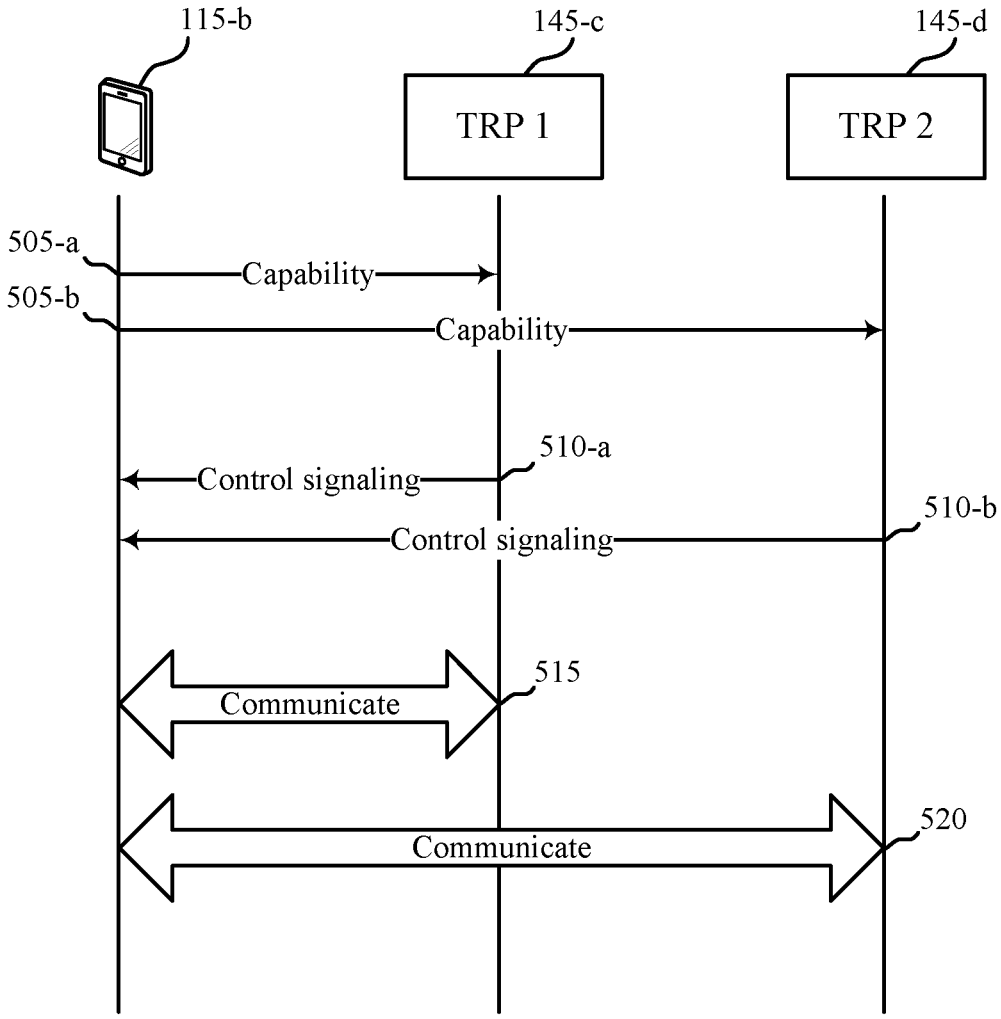
FIG. 5 illustrates an example of a process flow that supports per CORESET pool index processing capability in accordance with aspects of the present disclosure.

FIG. 5 illustrates an example of a process flow 500 that supports per CORESET pool index processing capability in accordance with aspects of the present disclosure. In some examples, some aspects of process flow 500 may implement or be implemented by aspects of wireless communications system 100. For example, process flow 500 may include TRP 145-*c* and TRP 145-*d* (e.g., a first TRP and a second TRP), which may be examples of a base station 105 described with reference to FIGS. 1 and 2. In some examples, each of TRPs 145-*b* and TRP 145-*c* may be base stations 105. process flow 500 may also include UE 115-*b*, which may be an example a UE 115 described with reference to FIGS. 1 and 2.

At 505, UE 115-*b* may transmit a capability message indicating a capability to first TRP 145-*c* (e.g., at 505-*a*), or to second TRP 145-*d* (e.g., at 505-*b*), or to both. In some cases, the capability message may indicate that UE 115-*b* supports, for a serving cell (e.g., TRP 145-*c* or TRP 145-*d*, or both), both a first processing capability associated with a first control resource set pool and a second processing capability associated with a second control resource set pool.

At 510, UE 115-*b* may receive, from TRP 145-*c* (e.g., at 510-*a*) or TRP 145-*d* (e.g., at 510-*b*), or both, control signaling identifying for UE 115-*b* a first control resource set configuration including the first control resource set pool and the second control resource set pool, the first control resource set pool associated with the first processing capability and the second control resource set pool associated with the second processing capability.

At 515, UE 115-*b* may communicate one or more messages to TRP 145-*c* on a first channel according to one of the first processing capability or the second processing capability that corresponds to the one of the first control resource set pool or the second control resource set pool.

At 520, UE 115-*b* may communicate one or more messages to TRP 145-*d* on a second channel according to one of the first processing capability or the second processing capability that corresponds to the one of the first control resource set pool or the second control resource set pool.

Figure 6:
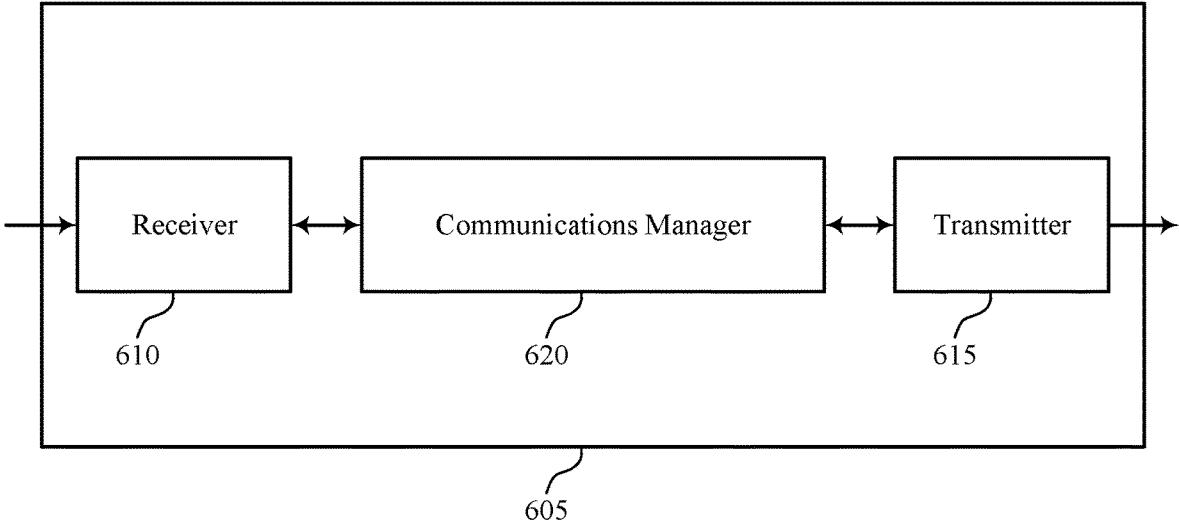
FIGS. 6 and 7 show block diagrams of devices that support per CORESET pool index processing capability in accordance with aspects of the present disclosure.

FIG. 6 shows a block diagram 600 of a device 605 that supports per CORESET pool index processing capability in accordance with aspects of the present disclosure. The device 605 may be an example of aspects of a UE 115 as described herein. The device 605 may include a receiver 610, a transmitter 615, and a communications manager 620. The device 605 may also include a processor. The device 605 may also include one or more processors, memory coupled with the one or more processors, and instructions stored in the memory that are executable by the one or more processors to enable the one or more processors to perform per CORESET pool index processing features discussed herein. Each of these components may be in communication with one another (e.g., via one or more buses).

The receiver 610 may provide a means for receiving information such as packets, user data, control information, or any combination thereof associated with various information channels (e.g., control channels, data channels, information channels related to per CORESET pool index processing capability). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to per CORESET pool index processing capability). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of per CORESET pool index processing capability as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for transmitting an indication of a capability of the UE to support, for a serving cell, both a first processing capability associated with a first control resource set pool and a second processing capability associated with a second control resource set pool. The communications manager 620 may be configured as or otherwise support a means for receiving, from a base station, control signaling identifying for the UE a control resource set configuration including the first control resource set pool and the second control resource set pool, the first control resource set pool associated with the first processing capability and the second control resource set pool associated with the second processing capability. The communications manager 620 may be configured as or otherwise support a means for communicating one or more messages on a channel according to one of the first processing capability or the second processing capability that corresponds to the one of the first control resource set pool or the second control resource set pool.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for increasing spectral efficiency in relation to a per CORESET pool index processing capability. The described techniques may support improvements in system efficiency, resulting in reduced processing, reduced power consumption, more efficient utilization of communication resources, and thus improving user experience.

Figure 7:
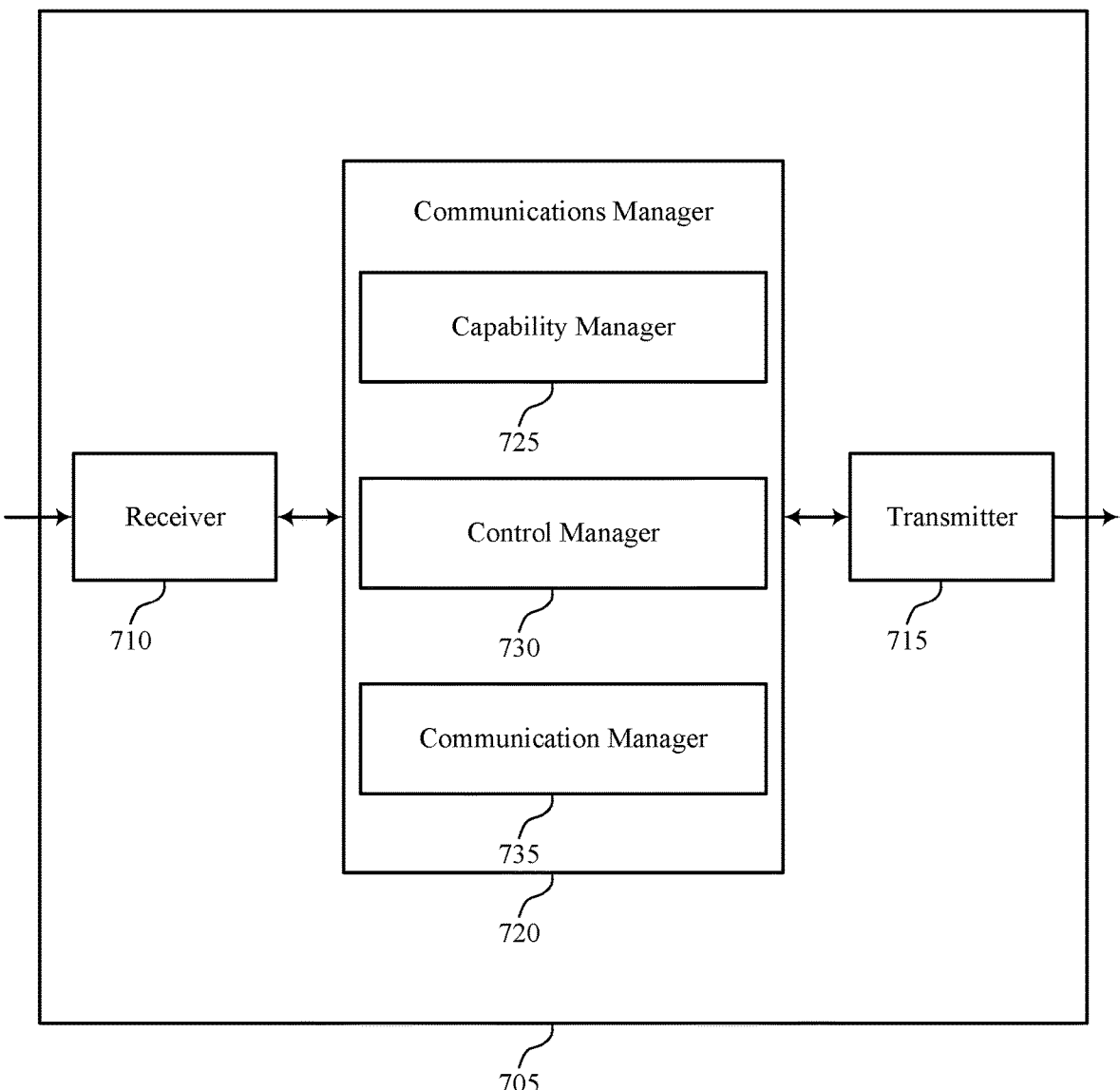

FIG. 7 shows a block diagram 700 of a device 705 that supports per CORESET pool index processing capability in accordance with aspects of the present disclosure. The device 705 may be an example of aspects of a device 605 or a UE 115 as described herein. The device 705 may include a receiver 710, a transmitter 715, and a communications manager 720. The device 705 may also include a processor.

In some cases, the capability manager 725, control manager 730, and communication manager 735, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of capability manager 725, control manager 730, and communication manager 735, discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device. Each of these components may be in communication with one another (e.g., via one or more buses).

The receiver 710 may provide a means for receiving information such as packets, user data, control information, or any combination thereof associated with various information channels (e.g., control channels, data channels, information channels related to per CORESET pool index processing capability). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to per CORESET pool index processing capability). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of per CORESET pool index processing capability as described herein. For example, the communications manager 720 may include a capability manager 725, a control manager 730, a communication manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The capability manager 725 may be configured as or otherwise support a means for transmitting an indication of a capability of the UE to support, for a serving cell, both a first processing capability associated with a first control resource set pool and a second processing capability associated with a second control resource set pool. The control manager 730 may be configured as or otherwise support a means for receiving, from a base station, control signaling identifying for the UE a control resource set configuration including the first control resource set pool and the second control resource set pool, the first control resource set pool associated with the first processing capability and the second control resource set pool associated with the second processing capability. The communication manager 735 may be configured as or otherwise support a means for communicating one or more messages on a channel according to one of the first processing capability or the second processing capability that corresponds to the one of the first control resource set pool or the second control resource set pool.

Figure 8:
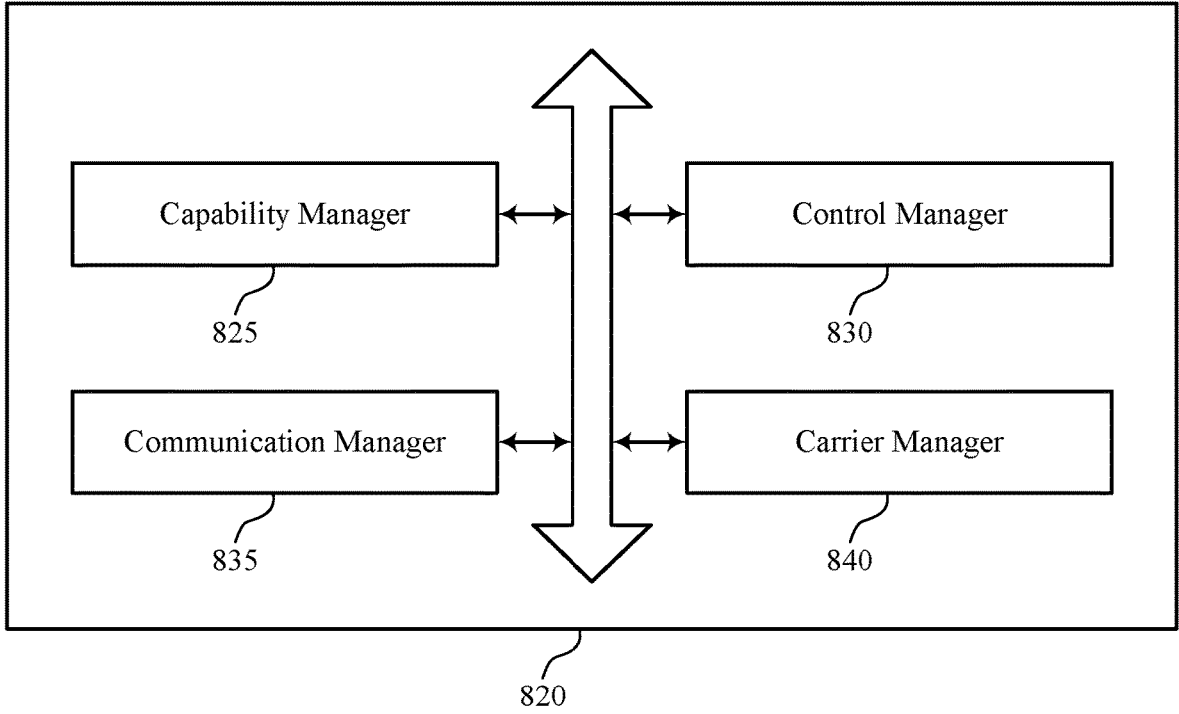
FIG. 8 shows a block diagram of a communications manager that supports per CORESET pool index processing capability in accordance with aspects of the present disclosure.

FIG. 8 shows a block diagram 800 of a communications manager 820 that supports per CORESET pool index processing capability in accordance with aspects of the present disclosure. The communications manager 820 may be an example of aspects of a communications manager 620, a communications manager 720, or both, as described herein. The communications manager 820, or various components thereof, may be an example of means for performing various aspects of per CORESET pool index processing capability as described herein. For example, the communications manager 820 may include a capability manager 825, a control manager 830, a communication manager 835, a carrier manager 840, or any combination thereof. In some cases, the capability manager 825, control manager 830, communication manager 835, and carrier manager 840 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of capability manager 825, control manager 830, communication manager 835, and carrier manager 840 discussed herein. Each of these components may communicate, directly or indirectly, with one another (e.g., via one or more buses).

The communications manager 820 may support wireless communication at a UE in accordance with examples as disclosed herein. The capability manager 825 may be configured as or otherwise support a means for transmitting an indication of a capability of the UE to support, for a serving cell, both a first processing capability associated with a first control resource set pool and a second processing capability associated with a second control resource set pool. The control manager 830 may be configured as or otherwise support a means for receiving, from a base station, control signaling identifying for the UE a control resource set configuration including the first control resource set pool and the second control resource set pool, the first control resource set pool associated with the first processing capability and the second control resource set pool associated with the second processing capability. The communication manager 835 may be configured as or otherwise support a means for communicating one or more messages on a channel according to one of the first processing capability or the second processing capability that corresponds to the one of the first control resource set pool or the second control resource set pool.

In some examples, to support communicating on the channel, the communication manager 835 may be configured as or otherwise support a means for receiving downlink control information, transmitting data on a physical uplink shared channel, transmitting uplink control information, receiving data on a physical downlink shared channel, or any combination thereof.

In some examples, to support receiving the control signaling identifying the control resource set configuration for the UE, the control manager 830 may be configured as or otherwise support a means for receiving the control resource set configuration, where a table at the UE maps between a first index value associated with the first control resource set pool of the control resource set configuration and the first processing capability, and between a second index value associated with the second control resource set pool of the control resource set configuration and the second processing capability.

In some examples, to support receiving the control signaling identifying the control resource set configuration for the UE, the control manager 830 may be configured as or otherwise support a means for receiving an indication of a mapping between a first index value associated with the first control resource set pool and the first processing capability, and between a second index value associated with the second control resource set pool and the second processing capability.

In some examples, the control manager 830 may be configured as or otherwise support a means for receiving a downlink control information message in a control resource set, the downlink control information message identifying time and frequency resources for communicating the one or more messages on the channel, where the one or more messages are communicated on the channel using the first processing capability based on identifying that the control resource set in which the downlink control information message is received is of the first control resource set pool.

In some examples, the control manager 830 may be configured as or otherwise support a means for receiving a control message identifying a configuration of a periodic set of time and frequency resources for communicating on the channel. In some examples, the control manager 830 may be configured as or otherwise support a means for receiving a downlink control information message in a control resource set, the downlink control information message activating one or more resources of the periodic set of time and frequency resources for communicating the one or more messages on the channel, where the one or more messages are communicated on the channel using the first processing capability based on identifying that the control resource set in which the downlink control information message is received is of the first control resource set pool.

In some examples, the control manager 830 may be configured as or otherwise support a means for receiving a control message identifying a configuration of a set of multiple periodic sets of time and frequency resources for communicating on the channel, the set of multiple periodic sets of time and frequency resources including at least a first periodic set of time and frequency resources associated with the first control resource set pool and a second periodic set of time and frequency resources associated with the second control resource set pool. In some examples, the control manager 830 may be configured as or otherwise support a means for receiving a downlink control information message, the downlink control information message activating resources of the first periodic set of time and frequency resources, where the one or more messages are communicated on the channel using the first processing capability based on the first periodic set of time and frequency resources being associated with the first processing capability. In some examples, the configuration of the first periodic set of time and frequency resources includes a semi-persistent scheduling configuration for downlink communications or a configured grant configuration for uplink communications.

In some examples, the control manager 830 may be configured as or otherwise support a means for receiving a control message identifying a configuration of a periodic set of time and frequency resources for communicating on the channel, the configuration of the periodic set of time and frequency resources indicating that the periodic set of time and frequency resources are associated with the first processing capability. In some examples, the control manager 830 may be configured as or otherwise support a means for receiving a downlink control information message, the downlink control information message activating resources of the periodic set of time and frequency resources, where the one or more messages are communicated on the channel using the first processing capability based on the configuration indicating that the periodic set of time and frequency resources is associated with the first processing capability.

In some examples, the indication of the capability is associated with one of downlink or uplink, and the capability manager 825 may be configured as or otherwise support a means for transmitting a second indication of a second capability of the UE to support, for a different one of downlink or uplink, or a different one of the first subcarrier spacing or the second subcarrier spacing, or both, at least two different processing capabilities for the first control resource set pool and the second control resource set pool.

In some examples, to support transmitting the indication of the capability, the capability manager 825 may be configured as or otherwise support a means for transmitting an indication of a first quantity of unicast channels per slot associated with the first control resource set pool, and an indication of a second quantity of unicast channels per slot associated with the second control resource set pool, where the first quantity is different than the second quantity.

In some examples, the carrier manager 840 may be configured as or otherwise support a means for transmitting, to the base station, an indication of a number of carriers value. In some examples, the carrier manager 840 may be configured as or otherwise support a means for determining that the UE supports the second processing capability in associated cells when the number of carriers value is greater than or equal to a sum of (a) a number of cells of the associated cells configured independent of the control resource set configuration, (b) a number of cells of the associated cells configured with at least one of different pool index values, and (c) two times a number of the cells of the associated cells configured with a first pool index value and a second pool index value.

In some examples, the carrier manager 840 may be configured as or otherwise support a means for transmitting an indication of a capability of the UE to support the second processing capability (a) when a single cell is configured in a frequency band where the number of carriers value is reported and the single cell is not configured with the first pool index value and the second pool index value, or (b) for the first pool index value when a single cell is configured in a frequency band where the number of carriers value is reported and the single cell is configured with the first pool index value and the second pool index value.

In some examples, to support communicating according to the second processing capability, the communication manager 835 may be configured as or otherwise support a means for communicating the one or more messages on the channel according to the second processing capability according to a maximum data rate per cell associated with the second control resource set pool, where the maximum data rate is based on a maximum quantity of layers, a maximum modulation order, a maximum bandwidth size, or a scaling factor, or any combination thereof, for the cell.

In some examples, the communication manager 835 may be configured as or otherwise support a means for identifying that the channel is associated with the first control resource set pool and that the channel overlaps with a second channel associated with the second control resource set pool. In some examples, the communication manager 835 may be configured as or otherwise support a means for communicating the one or more messages on the channel based on a sum of a first maximum data rate for the channel and a second maximum data rate for the second channel satisfying a data rate threshold.

Figure 9:
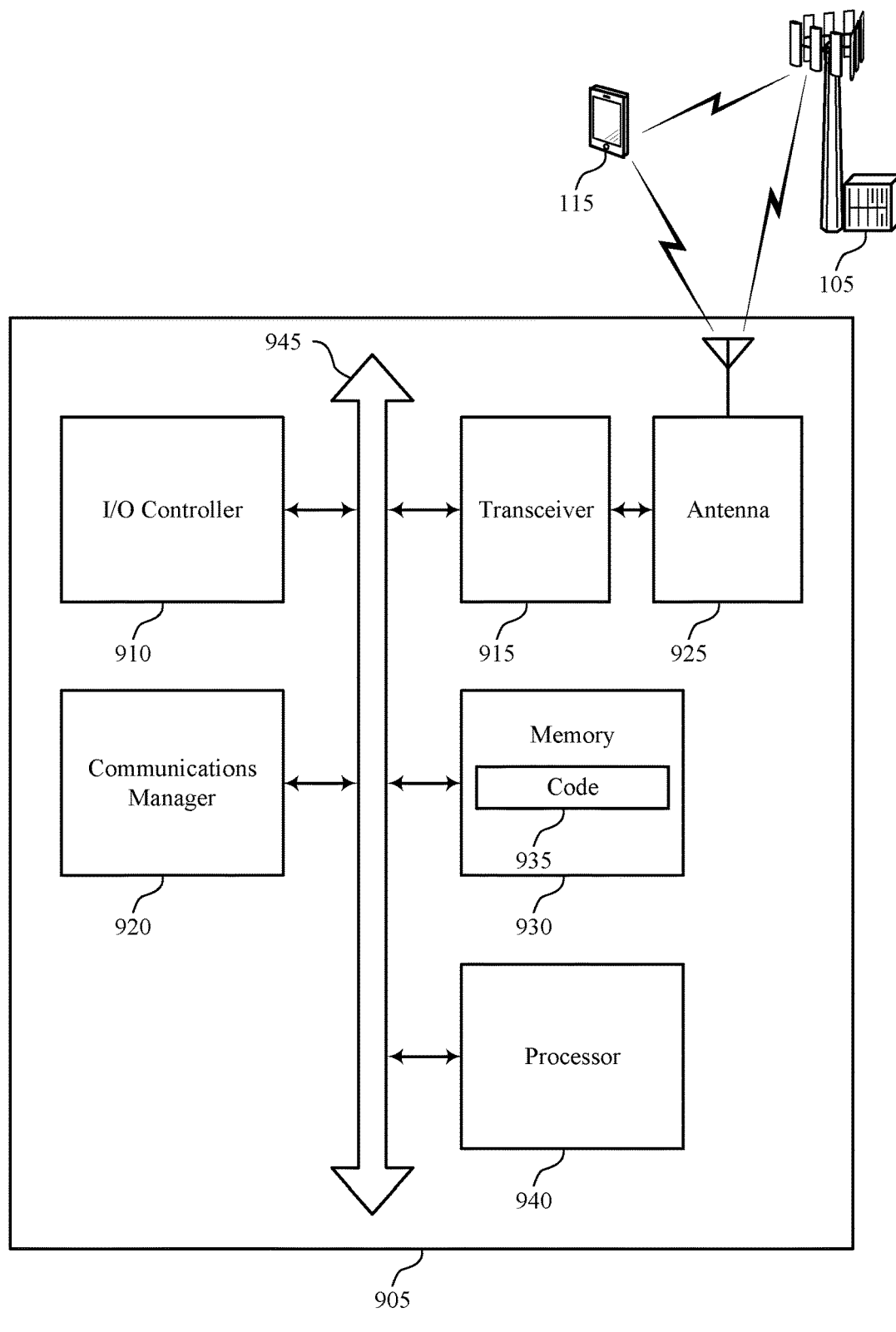
FIG. 9 shows a diagram of a system including a device that supports per CORESET pool index processing capability in accordance with aspects of the present disclosure.

FIG. 9 shows a diagram of a system 900 including a device 905 that supports per CORESET pool index processing capability in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting per CORESET pool index processing capability). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for transmitting an indication of a capability of the UE to support, for a serving cell, both a first processing capability associated with a first control resource set pool and a second processing capability associated with a second control resource set pool. The communications manager 920 may be configured as or otherwise support a means for receiving, from a base station, control signaling identifying for the UE a control resource set configuration including the first control resource set pool and the second control resource set pool, the first control resource set pool associated with the first processing capability and the second control resource set pool associated with the second processing capability. The communications manager 920 may be configured as or otherwise support a means for communicating one or more messages on a channel according to one of the first processing capability or the second processing capability that corresponds to the one of the first control resource set pool or the second control resource set pool.

By including or configuring the communications manager 920 in accordance with examples as described herein, the device 905 may support techniques for increasing spectral efficiency in relation to a per CORESET pool index processing capability. The described techniques may support improvements in system efficiency, resulting in increased communication reliability, reduced latency, improved user experience related to reduced processing, reduced power consumption, more efficient utilization of communication resources, increased coordination between devices, longer battery life, and increased utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of per CORESET pool index processing capability as described herein, or the processor 940 and the memory 930 may be otherwise configured to perform or support such operations.

Figure 10:
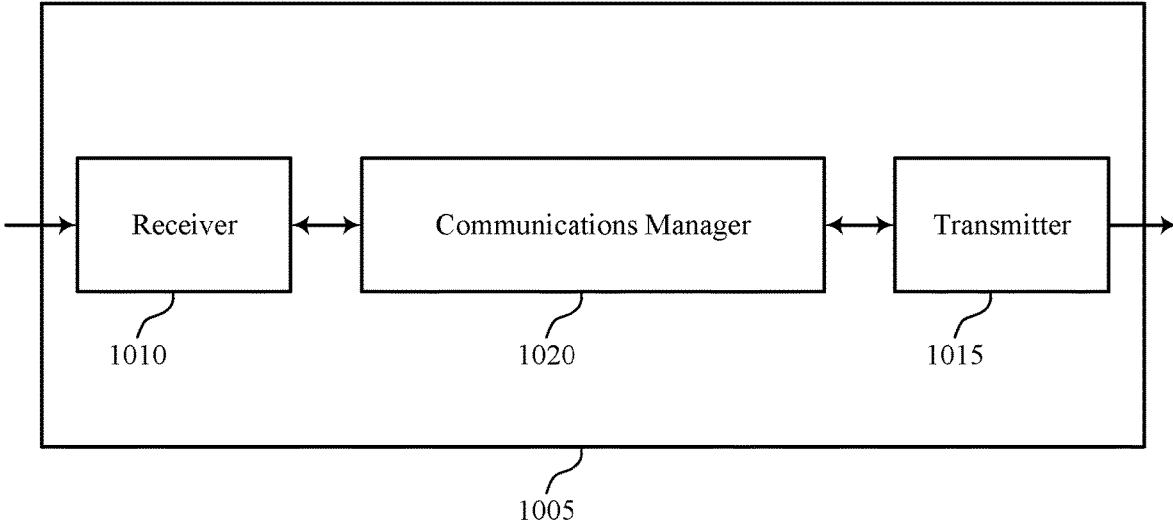
FIGS. 10 and 11 show block diagrams of devices that support per CORESET pool index processing capability in accordance with aspects of the present disclosure.

FIG. 10 shows a block diagram 1000 of a device 1005 that supports per CORESET pool index processing capability in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. The device 1005 may also include a processor. one or more processors, memory coupled with the one or more processors, and instructions stored in the memory that are executable by the one or more processors to enable the one or more processors to perform the per CORESET pool index processing features discussed herein. Each of these components may be in communication with each other (e.g., via one or more buses).

The receiver 1010 may provide a means for receiving information such as packets, user data, control information, or any combination thereof associated with various information channels (e.g., control channels, data channels, information channels related to per CORESET pool index processing capability). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to per CORESET pool index processing capability). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of per CORESET pool index processing capability as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry).

The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for receiving, from a UE, an indication of a capability of the UE to support, for a serving cell, both a first processing capability associated with a first control resource set pool and a second processing capability associated with a second control resource set pool. The communications manager 1020 may be configured as or otherwise support a means for transmitting, to the UE, control signaling identifying for the UE a control resource set configuration including the first control resource set pool and the second control resource set pool, the first control resource set pool associated with the first processing capability and the second control resource set pool associated with the second processing capability. The communications manager 1020 may be configured as or otherwise support a means for communicating one or more messages on a channel according to one of the first processing capability or the second processing capability that corresponds to the one of the first control resource set pool or the second control resource set pool.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for increasing spectral efficiency in relation to a per CORESET pool index processing capability. The described techniques may support improvements in system efficiency, resulting in reduced processing, reduced power consumption, more efficient utilization of communication resources, and thus improving user experience.

Figure 11:
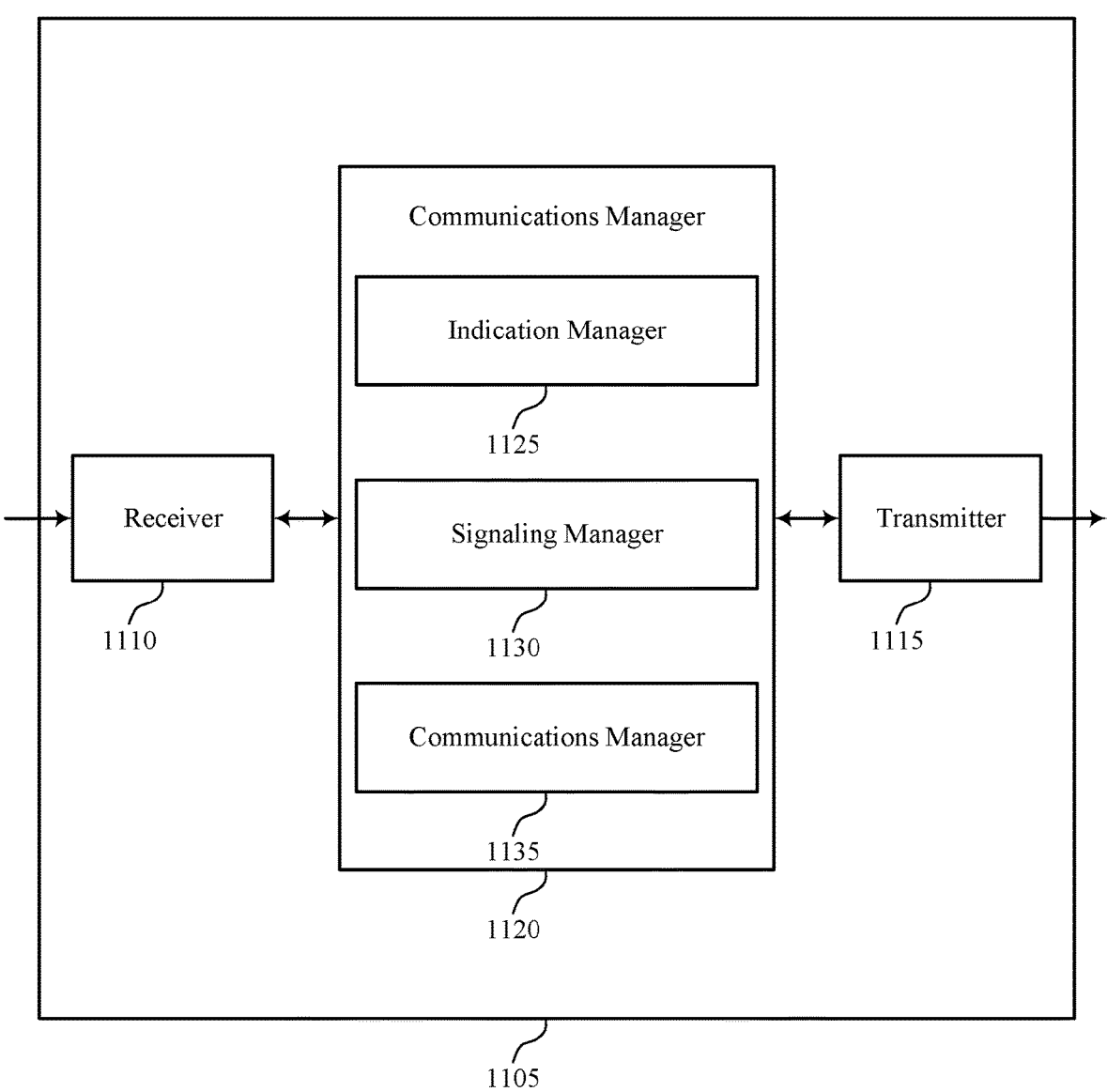

FIG. 11 shows a block diagram 1100 of a device 1105 that supports per CORESET pool index processing capability in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses). In some cases, the indication manager 1125, signaling manager 1130, communications manager 1135 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of indication manager 1125, signaling manager 1130, communications manager 1135 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

The receiver 1110 may provide a means for receiving information such as packets, user data, control information, or any combination thereof associated with various information channels (e.g., control channels, data channels, information channels related to per CORESET pool index processing capability). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to per CORESET pool index processing capability). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of per CORESET pool index processing capability as described herein. For example, the communications manager 1120 may include an indication manager 1125, a signaling manager 1130, a communications manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The indication manager 1125 may be configured as or otherwise support a means for receiving, from a UE, an indication of a capability of the UE to support, for a serving cell, both a first processing capability associated with a first control resource set pool and a second processing capability associated with a second control resource set pool. The signaling manager 1130 may be configured as or otherwise support a means for transmitting, to the UE, control signaling identifying for the UE a control resource set configuration including the first control resource set pool and the second control resource set pool, the first control resource set pool associated with the first processing capability and the second control resource set pool associated with the second processing capability. The communications manager 1135 may be configured as or otherwise support a means for communicating one or more messages on a channel according to one of the first processing capability or the second processing capability that corresponds to the one of the first control resource set pool or the second control resource set pool.

Figure 12:
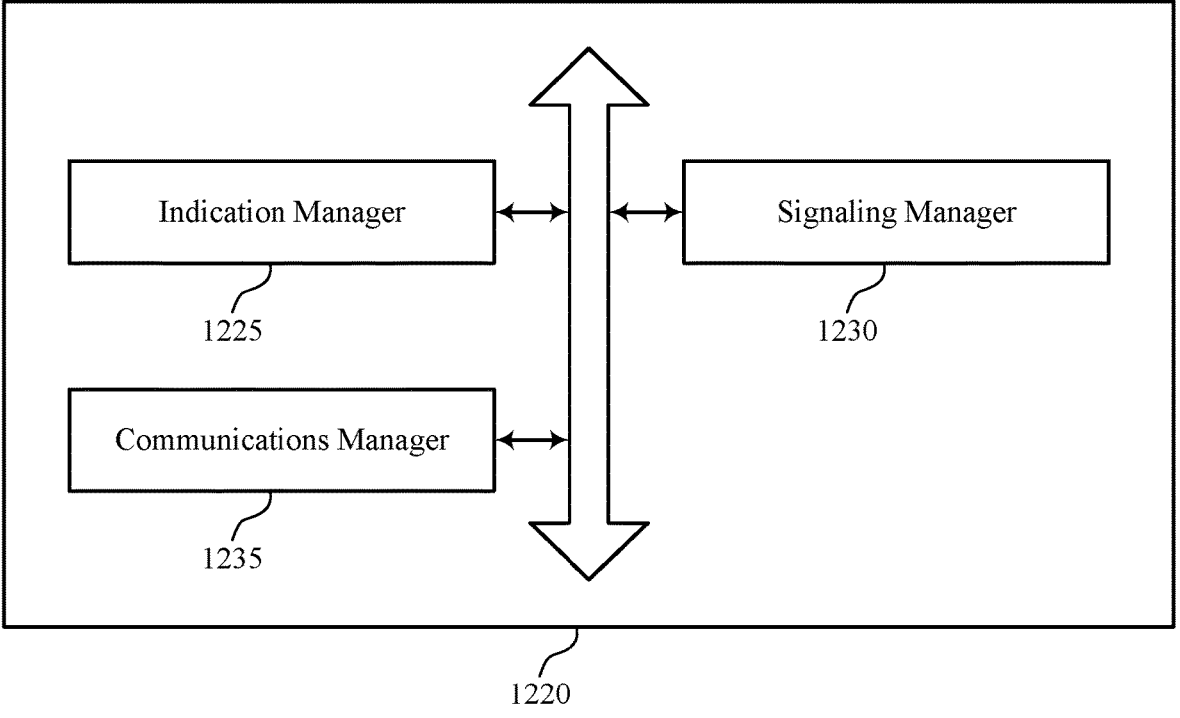
FIG. 12 shows a block diagram of a communications manager that supports per CORESET pool index processing capability in accordance with aspects of the present disclosure.

FIG. 12 shows a block diagram 1200 of a communications manager 1220 that supports per CORESET pool index processing capability in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of per CORESET pool index processing capability as described herein. For example, the communications manager 1220 may include an indication manager 1225, a signaling manager 1230, a communications manager 1235, or any combination thereof. Each of these components may communicate, directly or indirectly, with one another (e.g., via one or more buses). In some cases, the indication manager 1225, signaling manager 1230, and communications manager 1235 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of indication manager 1225, signaling manager 1230, and communications manager 1235 discussed herein.

The communications manager 1220 may support wireless communication at a base station in accordance with examples as disclosed herein. The indication manager 1225 may be configured as or otherwise support a means for receiving, from a UE, an indication of a capability of the UE to support, for a serving cell, both a first processing capability associated with a first control resource set pool and a second processing capability associated with a second control resource set pool. The signaling manager 1230 may be configured as or otherwise support a means for transmitting, to the UE, control signaling identifying for the UE a control resource set configuration including the first control resource set pool and the second control resource set pool, the first control resource set pool associated with the first processing capability and the second control resource set pool associated with the second processing capability. The communications manager 1235 may be configured as or otherwise support a means for communicating one or more messages on a channel according to one of the first processing capability or the second processing capability that corresponds to the one of the first control resource set pool or the second control resource set pool.

In some examples, to support communicating on the channel, the communications manager 1235 may be configured as or otherwise support a means for transmitting downlink control information, receiving data on a physical uplink shared channel, receiving uplink control information, transmitting data on a physical downlink shared channel, or any combination thereof.

In some examples, to support transmitting the control signaling identifying the control resource set configuration for the UE, the signaling manager 1230 may be configured as or otherwise support a means for transmitting the control resource set configuration, where a table at the UE maps between a first index value associated with the first control resource set pool of the control resource set configuration and the first processing capability, and between a second index value associated with the second control resource set pool of the control resource set configuration and the second processing capability.

In some examples, to support transmitting the control signaling identifying the control resource set configuration for the UE, the signaling manager 1230 may be configured as or otherwise support a means for transmitting, in the control resource set configuration, an indication of a mapping between a first index value associated with the first control resource set pool and the first processing capability, and between a second index value associated with the second control resource set pool and the second processing capability.

In some examples, the signaling manager 1230 may be configured as or otherwise support a means for transmitting a downlink control information message in a control resource set, the downlink control information message identifying time and frequency resources for communicating the one or more messages on the channel, where the one or more messages are communicated on the channel using the first processing capability based on identifying that the control resource set in which the downlink control information message is received is of the first control resource set pool.

In some examples, the signaling manager 1230 may be configured as or otherwise support a means for transmitting a control message identifying a configuration of a periodic set of time and frequency resources for communicating on the channel. In some examples, the signaling manager 1230 may be configured as or otherwise support a means for transmitting a downlink control information message in a control resource set, the downlink control information message activating one or more resources of the periodic set of time and frequency resources for communicating the one or more messages on the channel, where the one or more messages are communicated on the channel using the first processing capability based on identifying that the control resource set in which the downlink control information message is received is of the first control resource set pool.

In some examples, the signaling manager 1230 may be configured as or otherwise support a means for transmitting a control message identifying a configuration of a set of multiple periodic sets of time and frequency resources for communicating on the channel, the set of multiple periodic sets of time and frequency resources including at least a first periodic set of time and frequency resources associated with the first control resource set pool and a second periodic set of time and frequency resources associated with the second control resource set pool. In some examples, the signaling manager 1230 may be configured as or otherwise support a means for transmitting a downlink control information message, the downlink control information message activating resources of the first periodic set of time and frequency resources, where the one or more messages are communicated on the channel using the first processing capability based on the first periodic set of time and frequency resources being associated with the first processing capability.

In some examples, the signaling manager 1230 may be configured as or otherwise support a means for transmitting a control message identifying a configuration of a periodic set of time and frequency resources for communicating on the channel, the configuration of the periodic set of time and frequency resources indicating that the periodic set of time and frequency resources are associated with the first processing capability. In some examples, the signaling manager 1230 may be configured as or otherwise support a means for transmitting a downlink control information message, the downlink control information message activating resources of the periodic set of time and frequency resources, where the one or more messages are communicated on the channel using the first processing capability based on the configuration indicating that the periodic set of time and frequency resources is associated with the first processing capability.

In some examples, the indication of the capability is associated with one of downlink or uplink, and the indication manager 1225 may be configured as or otherwise support a means for receiving a second indication of a second capability of the UE to support, for a different one of downlink or uplink, or a different one of the first subcarrier spacing or the second subcarrier spacing, or both, at least two different processing capabilities for the first control resource set pool and the second control resource set pool.

In some examples, to support receiving the indication of the capability, the indication manager 1225 may be configured as or otherwise support a means for receiving an indication of a first quantity of unicast channels per slot associated with the first control resource set pool, and an indication of a second quantity of unicast channels per slot associated with the second control resource set pool, where the first quantity is different than the second quantity.

Figure 13:
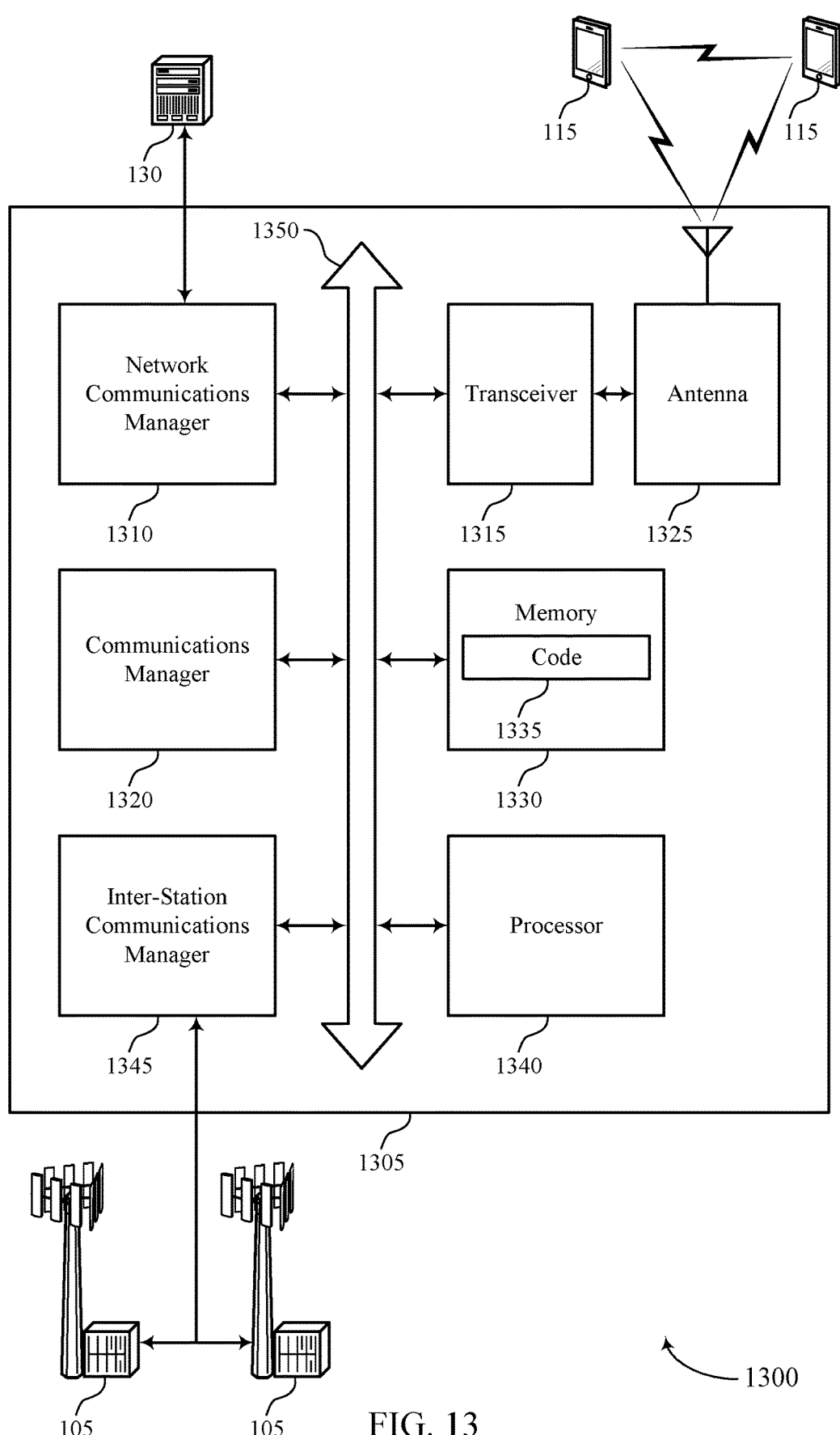
FIG. 13 shows a diagram of a system including a device that supports per CORESET pool index processing capability in accordance with aspects of the present disclosure.

FIG. 13 shows a diagram of a system 1300 including a device 1305 that supports per CORESET pool index processing capability in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting per CORESET pool index processing capability). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for receiving, from a UE, an indication of a capability of the UE to support, for a serving cell, both a first processing capability associated with a first control resource set pool and a second processing capability associated with a second control resource set pool. The communications manager 1320 may be configured as or otherwise support a means for transmitting, to the UE, control signaling identifying for the UE a control resource set configuration including the first control resource set pool and the second control resource set pool, the first control resource set pool associated with the first processing capability and the second control resource set pool associated with the second processing capability. The communications manager 1320 may be configured as or otherwise support a means for communicating one or more messages on a channel according to one of the first processing capability or the second processing capability that corresponds to the one of the first control resource set pool or the second control resource set pool.

By including or configuring the communications manager 1320 in accordance with examples as described herein, the device 1305 may support techniques for increasing spectral efficiency in relation to a per CORESET pool index processing capability. The described techniques may support improvements in system efficiency, resulting in improved communication reliability, reduced latency, improved user experience related to reduced processing, reduced power consumption, more efficient utilization of communication resources, improved coordination between devices, longer battery life, improved utilization of processing capability, and thus improving user experience.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of per CORESET pool index processing capability as described herein, or the processor 1340 and the memory 1330 may be otherwise configured to perform or support such operations.

FIG. 14 shows a flowchart illustrating a method 1400 that supports per CORESET pool index processing capability in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include transmitting an indication of a capability of the UE to support, for a serving cell, both a first processing capability associated with a first control resource set pool and a second processing capability associated with a second control resource set pool. The operations of 1405 may be performed in accordance with examples as disclosed herein. In some examples, aspects of the operations of 1405 may be performed by a capability manager 825 as described with reference to FIG. 8.

At 1410, the method may include receiving, from a base station, control signaling identifying for the UE a control resource set configuration including the first control resource set pool and the second control resource set pool, the first control resource set pool associated with the first processing capability and the second control resource set pool associated with the second processing capability. The operations of 1410 may be performed in accordance with examples as disclosed herein. In some examples, aspects of the operations of 1410 may be performed by a control manager 830 as described with reference to FIG. 8.

At 1415, the method may include communicating one or more messages on a channel according to one of the first processing capability or the second processing capability that corresponds to the one of the first control resource set pool or the second control resource set pool. The operations of 1415 may be performed in accordance with examples as disclosed herein. In some examples, aspects of the operations of 1415 may be performed by a communication manager 835 as described with reference to FIG. 8.

FIG. 15 shows a flowchart illustrating a method 1500 that supports per CORESET pool index processing capability in accordance with aspects of the present disclosure. The operations of the method 1500 may be implemented by a base station or its components as described herein. For example, the operations of the method 1500 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1505, the method may include receiving, from a UE, an indication of a capability of the UE to support, for a serving cell, both a first processing capability associated with a first control resource set pool and a second processing capability associated with a second control resource set pool. The operations of 1505 may be performed in accordance with examples as disclosed herein. In some examples, aspects of the operations of 1505 may be performed by an indication manager 1225 as described with reference to FIG. 12.

At 1510, the method may include transmitting, to the UE, control signaling identifying for the UE a control resource set configuration including the first control resource set pool and the second control resource set pool, the first control resource set pool associated with the first processing capability and the second control resource set pool associated with the second processing capability. The operations of 1510 may be performed in accordance with examples as disclosed herein. In some examples, aspects of the operations of 1510 may be performed by a signaling manager 1230 as described with reference to FIG. 12.

At 1515, the method may include communicating one or more messages on a channel according to one of the first processing capability or the second processing capability that corresponds to the one of the first control resource set pool or the second control resource set pool. The operations of 1515 may be performed in accordance with examples as disclosed herein. In some examples, aspects of the operations of 1515 may be performed by a communications manager 1235 as described with reference to FIG. 12.

The following provides an overview of aspects of the present disclosure:

Aspect 1: A method for wireless communication at a UE, comprising: transmitting an indication of a capability of the UE to support, for a serving cell, both a first processing capability associated with a first control resource set pool and a second processing capability associated with a second control resource set pool; receiving, from a base station, control signaling identifying for the UE a control resource set configuration including the first control resource set pool and the second control resource set pool, the first control resource set pool associated with the first processing capability and the second control resource set pool associated with the second processing capability; and communicating one or more messages on a channel according to one of the first processing capability or the second processing capability that corresponds to the one of the first control resource set pool or the second control resource set pool.

Aspect 2: The method of aspect 1, wherein communicating on the channel comprises: receiving downlink control information, transmitting data on a physical uplink shared channel, transmitting uplink control information, receiving data on a physical downlink shared channel, or any combination thereof.

Aspect 3: The method of any of aspects 1 through 2, wherein receiving the control signaling identifying the control resource set configuration for the UE further comprises: receiving the control resource set configuration, wherein a table at the UE maps between a first index value associated with the first control resource set pool of the control resource set configuration and the first processing capability, and between a second index value associated with the second control resource set pool of the control resource set configuration and the second processing capability.

Aspect 4: The method of any of aspects 1 through 3, wherein receiving the control signaling identifying the control resource set configuration for the UE further comprises: receiving an indication of a mapping between a first index value associated with the first control resource set pool and the first processing capability, and between a second index value associated with the second control resource set pool and the second processing capability.

Aspect 5: The method of any of aspects 1 through 4, further comprising: receiving a downlink control information message in a control resource set, the downlink control information message identifying time and frequency resources for communicating the one or more messages on the channel, wherein the one or more messages are communicated on the channel using the first processing capability based at least in part on identifying that the control resource set in which the downlink control information message is received is of the first control resource set pool.

Aspect 6: The method of any of aspects 1 through 5, further comprising: receiving a control message identifying a configuration of a periodic set of time and frequency resources for communicating on the channel; and receiving a downlink control information message in a control resource set, the downlink control information message activating one or more resources of the periodic set of time and frequency resources for communicating the one or more messages on the channel, wherein the one or more messages are communicated on the channel using the first processing capability based at least in part on identifying that the control resource set in which the downlink control information message is received is of the first control resource set pool.

Aspect 7: The method of any of aspects 1 through 6, further comprising: receiving a control message identifying a configuration of a plurality of periodic sets of time and frequency resources for communicating on the channel, the plurality of periodic sets of time and frequency resources including at least a first periodic set of time and frequency resources associated with the first control resource set pool and a second periodic set of time and frequency resources associated with the second control resource set pool; and receiving a downlink control information message, the downlink control information message activating resources of the first periodic set of time and frequency resources, wherein the one or more messages are communicated on the channel using the first processing capability based at least in part on the first periodic set of time and frequency resources being associated with the first processing capability.

Aspect 8: The method of aspect 7, wherein the configuration of the first periodic set of time and frequency resources comprises a semi-persistent scheduling configuration for downlink communications or a configured grant configuration for uplink communications.

Aspect 9: The method of any of aspects 1 through 8, further comprising: receiving a control message identifying a configuration of a periodic set of time and frequency resources for communicating on the channel, the configuration of the periodic set of time and frequency resources indicating that the periodic set of time and frequency resources are associated with the first processing capability; and receiving a downlink control information message, the downlink control information message activating resources of the periodic set of time and frequency resources, wherein the one or more messages are communicated on the channel using the first processing capability based at least in part on the configuration indicating that the periodic set of time and frequency resources is associated with the first processing capability.

Aspect 10: The method of any of aspects 1 through 9, wherein the indication of the capability is associated with one of downlink or uplink, or one of a first subcarrier spacing or a second subcarrier spacing, or both, the method further comprising: transmitting a second indication of a second capability of the UE to support, for a different one of downlink or uplink, or a different one of the first subcarrier spacing or the second subcarrier spacing, or both, at least two different processing capabilities for the first control resource set pool and the second control resource set pool.

Aspect 11: The method of any of aspects 1 through 10, wherein transmitting the indication of the capability further comprises: transmitting an indication of a first quantity of unicast channels per slot associated with the first control resource set pool, and an indication of a second quantity of unicast channels per slot associated with the second control resource set pool, wherein the first quantity is different than the second quantity.

Aspect 12: The method of any of aspects 1 through 11, further comprising: transmitting, to the base station, an indication of a number of carriers value; and determining that the UE supports the second processing capability in associated cells when the number of carriers value is greater than or equal to a sum of (a) a number of cells of the associated cells configured independent of the control resource set configuration, (b) a number of cells of the associated cells configured with at least one of different pool index values, and (c) two times a number of the cells of the associated cells configured with a first pool index value and a second pool index value.

Aspect 13: The method of aspect 12, further comprising: transmitting an indication of a capability of the UE to support the second processing capability (a) when a single cell is configured in a frequency band where the number of carriers value is reported and the single cell is not configured with the first pool index value and the second pool index value, or (b) for the first pool index value when a single cell is configured in a frequency band where the number of carriers value is reported and the single cell is configured with the first pool index value and the second pool index value.

Aspect 14: The method of any of aspects 1 through 13, wherein communicating according to the second processing capability comprises: communicating the one or more messages on the channel according to the second processing capability according to a maximum data rate per cell associated with the second control resource set pool, wherein the maximum data rate is based at least in part on a maximum quantity of layers, a maximum modulation order, a maximum bandwidth size, or a scaling factor, or any combination thereof, for the cell.

Aspect 15: The method of any of aspects 1 through 14, further comprising: identifying that the channel is associated with the first control resource set pool and that the channel overlaps with a second channel associated with the second control resource set pool; and communicating the one or more messages on the channel based at least in part on a sum of a first maximum data rate for the channel and a second maximum data rate for the second channel satisfying a data rate threshold.

Aspect 16: A method for wireless communication at a base station, comprising: receiving, from a UE, an indication of a capability of the UE to support, for a serving cell, both a first processing capability associated with a first control resource set pool and a second processing capability associated with a second control resource set pool; transmitting, to the UE, control signaling identifying for the UE a control resource set configuration including the first control resource set pool and the second control resource set pool, the first control resource set pool associated with the first processing capability and the second control resource set pool associated with the second processing capability; and communicating one or more messages on a channel according to one of the first processing capability or the second processing capability that corresponds to the one of the first control resource set pool or the second control resource set pool.

Aspect 17: The method of aspect 16, wherein communicating on the channel comprises: transmitting downlink control information, receiving data on a physical uplink shared channel, receiving uplink control information, transmitting data on a physical downlink shared channel, or any combination thereof.

Aspect 18: The method of any of aspects 16 through 17, wherein transmitting the control signaling identifying the control resource set configuration for the UE further comprises: transmitting the control resource set configuration, wherein a table at the UE maps between a first index value associated with the first control resource set pool of the control resource set configuration and the first processing capability, and between a second index value associated with the second control resource set pool of the control resource set configuration and the second processing capability.

Aspect 19: The method of any of aspects 16 through 18, wherein transmitting the control signaling identifying the control resource set configuration for the UE further comprises: transmitting, in the control resource set configuration, an indication of a mapping between a first index value associated with the first control resource set pool and the first processing capability, and between a second index value associated with the second control resource set pool and the second processing capability.

Aspect 20: The method of any of aspects 16 through 19, further comprising: transmitting a downlink control information message in a control resource set, the downlink control information message identifying time and frequency resources for communicating the one or more messages on the channel, wherein the one or more messages are communicated on the channel using the first processing capability based at least in part on identifying that the control resource set in which the downlink control information message is received is of the first control resource set pool.

Aspect 21: The method of any of aspects 16 through 20, further comprising: transmitting a control message identifying a configuration of a periodic set of time and frequency resources for communicating on the channel; and transmitting a downlink control information message in a control resource set, the downlink control information message activating one or more resources of the periodic set of time and frequency resources for communicating the one or more messages on the channel, wherein the one or more messages are communicated on the channel using the first processing capability based at least in part on identifying that the control resource set in which the downlink control information message is received is of the first control resource set pool.

Aspect 22: The method of any of aspects 16 through 21, further comprising: transmitting a control message identifying a configuration of a plurality of periodic sets of time and frequency resources for communicating on the channel, the plurality of periodic sets of time and frequency resources including at least a first periodic set of time and frequency resources associated with the first control resource set pool and a second periodic set of time and frequency resources associated with the second control resource set pool; and transmitting a downlink control information message, the downlink control information message activating resources of the first periodic set of time and frequency resources, wherein the one or more messages are communicated on the channel using the first processing capability based at least in part on the first periodic set of time and frequency resources being associated with the first processing capability.

Aspect 23: The method of any of aspects 16 through 22, further comprising: transmitting a control message identifying a configuration of a periodic set of time and frequency resources for communicating on the channel, the configuration of the periodic set of time and frequency resources indicating that the periodic set of time and frequency resources are associated with the first processing capability; and transmitting a downlink control information message, the downlink control information message activating resources of the periodic set of time and frequency resources, wherein the one or more messages are communicated on the channel using the first processing capability based at least in part on the configuration indicating that the periodic set of time and frequency resources is associated with the first processing capability.

Aspect 24: The method of any of aspects 16 through 23, wherein the indication of the capability is associated with one of downlink or uplink, or one of a first subcarrier spacing or a second subcarrier spacing, or both, the method further comprising: receiving a second indication of a second capability of the UE to support, for a different one of downlink or uplink, or a different one of the first subcarrier spacing or the second subcarrier spacing, or both, at least two different processing capabilities for the first control resource set pool and the second control resource set pool.

Aspect 25: The method of any of aspects 16 through 24, wherein receiving the indication of the capability further comprises: receiving an indication of a first quantity of unicast channels per slot associated with the first control resource set pool, and an indication of a second quantity of unicast channels per slot associated with the second control resource set pool, wherein the first quantity is different than the second quantity.

Aspect 26: An apparatus for wireless communication at a UE, comprising a processor; memory coupled with the processor; and instructions stored in the memory and executable by the processor to cause the apparatus to perform a method of any of aspects 1 through 15.

Aspect 27: An apparatus for wireless communication at a UE, comprising at least one means for performing a method of any of aspects 1 through 15.

Aspect 28: A non-transitory computer-readable medium storing code for wireless communication at a UE, the code comprising instructions executable by a processor to perform a method of any of aspects 1 through 15.

Aspect 29: An apparatus for wireless communication at a base station, comprising a processor; memory coupled with the processor; and instructions stored in the memory and executable by the processor to cause the apparatus to perform a method of any of aspects 16 through 25.

Aspect 30: An apparatus for wireless communication at a base station, comprising at least one means for performing a method of any of aspects 16 through 25.

Aspect 31: A non-transitory computer-readable medium storing code for wireless communication at a base station, the code comprising instructions executable by a processor to perform a method of any of aspects 16 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   memory coupled with the one or more processors; and
   instructions stored in the memory and executable by the one or more processors to cause the UE to:
   transmit an indication of a capability of the UE to support, for a serving cell, both a first processing capability associated with a first control resource set pool and a second processing capability associated with a second control resource set pool;
   receive, from a base station and via control signaling, a control resource set configuration including the first control resource set pool and the second control resource set pool, the first control resource set pool associated with the first processing capability and the second control resource set pool associated with the second processing capability, wherein a mapping at the UE maps between a first index value associated with the first control resource set pool of the control resource set configuration and the first processing capability, and between a second index value associated with the second control resource set pool of the control resource set configuration and the second processing capability; and
   communicate one or more messages on a channel according to one of the first processing capability or the second processing capability that corresponds to the one of the first control resource set pool or the second control resource set pool.

2. The apparatus of claim 1, wherein, to communicate on the channel, the instructions are further executable by the one or more processors to cause the UE to:

receive downlink control information, transmitting data on a physical uplink shared channel, transmitting uplink control information, receiving data on a physical downlink shared channel, or any combination thereof.

3. The apparatus of claim 1, wherein the instructions are further executable by the one or more processors to cause the UE to:

receive a downlink control information message in a control resource set, the downlink control information message identifying time and frequency resources for communicating the one or more messages on the channel, wherein the one or more messages are communicated on the channel using the first processing capability based at least in part on identifying that the control resource set in which the downlink control information message is received is of the first control resource set pool.

4. The apparatus of claim 1, wherein the instructions are further executable by the one or more processors to cause the UE to:

receive a control message identifying a configuration of a periodic set of time and frequency resources for communicating on the channel; and receive a downlink control information message in a control resource set, the downlink control information message activating one or more resources of the periodic set of time and frequency resources for communicating the one or more messages on the channel, wherein the one or more messages are communicated on the channel using the first processing capability based at least in part on identifying that the control resource set in which the downlink control information message is received is of the first control resource set pool.

5. The apparatus of claim 1, wherein the instructions are further executable by the one or more processors to cause the UE to:

receive a control message identifying a configuration of a plurality of periodic sets of time and frequency resources for communicating on the channel, the plurality of periodic sets of time and frequency resources including at least a first periodic set of time and frequency resources associated with the first control resource set pool and a second periodic set of time and frequency resources associated with the second control resource set pool; and receive a downlink control information message, the downlink control information message activating resources of the first periodic set of time and frequency resources, wherein the one or more messages are communicated on the channel using the first processing capability based at least in part on the first periodic set of time and frequency resources being associated with the first processing capability.

6. The apparatus of claim 5, wherein the configuration of the first periodic set of time and frequency resources comprises a semi-persistent scheduling configuration for downlink communications or a configured grant configuration for uplink communications.

7. The apparatus of claim 1, wherein the instructions are further executable by the one or more processors to cause the UE to:

receive a control message identifying a configuration of a periodic set of time and frequency resources for communicating on the channel, the configuration of the periodic set of time and frequency resources indicating that the periodic set of time and frequency resources are associated with the first processing capability; and receive a downlink control information message, the downlink control information message activating resources of the periodic set of time and frequency resources, wherein the one or more messages are communicated on the channel using the first processing capability based at least in part on the configuration indicating that the periodic set of time and frequency resources is associated with the first processing capability.

8. The apparatus of claim 1, wherein the indication of the capability is associated with one of downlink or uplink, and the instructions are further executable by the one or more processors to cause the UE to:

transmit a second indication of a second capability of the UE to support, for a different one of the downlink or the uplink, or a different one of a first subcarrier spacing or a second subcarrier spacing, or both, at least two different processing capabilities for the first control resource set pool and the second control resource set pool.

9. The apparatus of claim 1, wherein, to transmit the indication of the capability, the instructions are further executable by the one or more processors to cause the UE to:

transmit an indication of a first quantity of unicast channels per slot associated with the first control resource set pool, and an indication of a second quantity of unicast channels per slot associated with the second control resource set pool, wherein the first quantity is different than the second quantity.

10. The apparatus of claim 1, wherein the instructions are further executable by the one or more processors to cause the UE to:

transmit, to the base station, an indication of a number of carriers value; and determine that the UE supports the second processing capability in associated cells when the number of carriers value is greater than or equal to a sum of (a) a number of cells of the associated cells configured independent of the control resource set configuration, (b) a number of cells of the associated cells configured with at least one of different pool index values, and (c) two times a number of the cells of the associated cells configured with a first pool index value and a second pool index value.

11. The apparatus of claim 10, wherein the instructions are further executable by the one or more processors to cause the UE to:

transmit an indication of a capability of the UE to support the second processing capability (a) when a single cell is configured in a frequency band where the number of carriers value is reported and the single cell is not configured with the first pool index value and the second pool index value, or (b) for the first pool index value when a single cell is configured in a frequency band where the number of carriers value is reported and the single cell is configured with the first pool index value and the second pool index value.

12. The apparatus of claim 1, wherein, to communicate according to the second processing capability, the instructions are further executable by the one or more processors to cause the UE to:

communicate the one or more messages on the channel according to the second processing capability according to a maximum data rate per cell associated with the second control resource set pool, wherein the maximum data rate is based at least in part on a maximum quantity of layers, a maximum modulation order, a maximum bandwidth size, or a scaling factor, or any combination thereof, for the cell.

13. The apparatus of claim 1, wherein the instructions are further executable by the one or more processors to cause the UE to:

identify that the channel is associated with the first control resource set pool and that the channel overlaps with a second channel associated with the second control resource set pool; and communicate the one or more messages on the channel based at least in part on a sum of a first maximum data rate for the channel and a second maximum data rate for the second channel satisfying a data rate threshold.

14. An apparatus for wireless communication at a base station, comprising:

one or more processors;

memory coupled with the one or more processors; and instructions stored in the memory and executable by the one or more processors to cause the base station to:

receive, from a user equipment (UE), an indication of a capability of the UE to support, for a serving cell, both a first processing capability associated with a first control resource set pool and a second processing capability associated with a second control resource set pool;

transmit, to the UE via control signaling, a control resource set configuration including the first control resource set pool and the second control resource set pool, the first control resource set pool associated with the first processing capability and the second control resource set pool associated with the second processing capability, wherein a mapping at the UE maps between a first index value associated with the first control resource set pool of the control resource set configuration and the first processing capability, and between a second index value associated with the second control resource set pool of the control resource set configuration and the second processing capability; and communicate one or more messages on a channel according to one of the first processing capability or the second processing capability that corresponds to the one of the first control resource set pool or the second control resource set pool.

15. The apparatus of claim 14, wherein, to communicate on the channel, the instructions are further executable by the one or more processors to cause the base station to:

transmit downlink control information, receiving data on a physical uplink shared channel, receiving uplink control information, transmitting data on a physical downlink shared channel, or any combination thereof.

16. The apparatus of claim 14, wherein the instructions are further executable by the one or more processors to cause the base station to:

transmit a downlink control information message in a control resource set, the downlink control information message identifying time and frequency resources for communicating the one or more messages on the channel, wherein the one or more messages are communicated on the channel using the first processing capability based at least in part on identifying that the control resource set in which the downlink control information message is received is of the first control resource set pool.

17. The apparatus of claim 14, wherein the instructions are further executable by the one or more processors to cause the base station to:

transmit a control message identifying a configuration of a periodic set of time and frequency resources for communicating on the channel; and transmit a downlink control information message in a control resource set, the downlink control information message activating one or more resources of the periodic set of time and frequency resources for communicating the one or more messages on the channel, wherein the one or more messages are communicated on the channel using the first processing capability based at least in part on identifying that the control resource set in which the downlink control information message is received is of the first control resource set pool.

18. The apparatus of claim 14, wherein the instructions are further executable by the one or more processors to cause the base station to:

transmit a control message identifying a configuration of a plurality of periodic sets of time and frequency resources for communicating on the channel, the plurality of periodic sets of time and frequency resources including at least a first periodic set of time and frequency resources associated with the first control resource set pool and a second periodic set of time and frequency resources associated with the second control resource set pool; and transmit a downlink control information message, the downlink control information message activating resources of the first periodic set of time and frequency resources, wherein the one or more messages are communicated on the channel using the first processing capability based at least in part on the first periodic set of time and frequency resources being associated with the first processing capability.

19. The apparatus of claim 14, wherein the instructions are further executable by the one or more processors to cause the base station to:

transmit a control message identifying a configuration of a periodic set of time and frequency resources for communicating on the channel, the configuration of the periodic set of time and frequency resources indicating that the periodic set of time and frequency resources are associated with the first processing capability; and transmit a downlink control information message, the downlink control information message activating resources of the periodic set of time and frequency resources, wherein the one or more messages are communicated on the channel using the first processing capability based at least in part on the configuration indicating that the periodic set of time and frequency resources is associated with the first processing capability.

20. The apparatus of claim 14, wherein the indication of the capability is associated with one of downlink or uplink, the instructions being further executable by the one or more processors to cause the base station to:

receive a second indication of a second capability of the UE to support, for a different one of the downlink or the uplink, or a different one of a first subcarrier spacing or a second subcarrier spacing, or both, at least two different processing capabilities for the first control resource set pool and the second control resource set pool.

21. The apparatus of claim 14, wherein, to receive the indication of the capability, the instructions are further executable by the one or more processors to cause the base station to:

receive an indication of a first quantity of unicast channels per slot associated with the first control resource set pool, and an indication of a second quantity of unicast channels per slot associated with the second control resource set pool, wherein the first quantity is different than the second quantity.

22. A method for wireless communication at a user equipment (UE), comprising:

transmitting an indication of a capability of the UE to support, for a serving cell, both a first processing capability associated with a first control resource set pool and a second processing capability associated with a second control resource set pool;

receiving, from a base station and via control signaling, a control resource set configuration including the first control resource set pool and the second control resource set pool, the first control resource set pool associated with the first processing capability and the second control resource set pool associated with the second processing capability, wherein a mapping at the UE maps between a first index value associated with the first control resource set pool of the control resource set configuration and the first processing capability, and between a second index value associated with the second control resource set pool of the control resource set configuration and the second processing capability; and communicating one or more messages on a channel according to one of the first processing capability or the second processing capability that corresponds to the one of the first control resource set pool or the second control resource set pool.

23. The method of claim 22, wherein communicating on the channel comprises:

receiving downlink control information, transmitting data on a physical uplink shared channel, transmitting uplink control information, receiving data on a physical downlink shared channel, or any combination thereof.

24. A method for wireless communication at a base station, comprising:

receiving, from a user equipment (UE), an indication of a capability of the UE to support, for a serving cell, both a first processing capability associated with a first control resource set pool and a second processing capability associated with a second control resource set pool;

transmitting, to the UE via control signaling, a control resource set configuration including the first control resource set pool and the second control resource set pool, the first control resource set pool associated with the first processing capability and the second control resource set pool associated with the second processing capability, wherein a mapping at the UE maps between a first index value associated with the first control resource set pool of the control resource set configuration and the first processing capability, and between a second index value associated with the second control resource set pool of the control resource set configuration and the second processing capability; and communicating one or more messages on a channel according to one of the first processing capability or the second processing capability that corresponds to the one of the first control resource set pool or the second control resource set pool.

\*　\*　\*　\*　\*